(12) United States Patent
Moellenberg et al.

(10) Patent No.: US 11,054,850 B2
(45) Date of Patent: Jul. 6, 2021

(54) PORTABLE SOLAR POWER MANAGEMENT SYSTEM

(71) Applicant: We Care Solar, Berkeley, CA (US)

(72) Inventors: Brent Moellenberg, Lyons, CO (US); Rex Lu, Richmond, CA (US); Hal Robin Aronson, Berkeley, CA (US)

(73) Assignee: We Care Solar, Berkeley, CA (US)

(*) Notice: Subject to any disclaimer, the term of this patent is extended or adjusted under 35 U.S.C. 154(b) by 283 days.

(21) Appl. No.: 16/390,978

(22) Filed: Apr. 22, 2019

(65) Prior Publication Data

US 2019/0326774 A1 Oct. 24, 2019

Related U.S. Application Data

(60) Provisional application No. 62/661,847, filed on Apr. 24, 2018.

(51) Int. Cl.
| | |
|---|---|
| G05F 1/67 | (2006.01) |
| H02J 7/35 | (2006.01) |
| H02J 7/00 | (2006.01) |
| H02S 40/38 | (2014.01) |

(52) U.S. Cl.
CPC .............. *G05F 1/67* (2013.01); *H02J 7/008* (2013.01); *H02J 7/0063* (2013.01); *H02J 7/0068* (2013.01); *H02J 7/35* (2013.01); *H02S 40/38* (2014.12)

(58) Field of Classification Search
CPC ........ H02J 7/35; H02J 7/00304; H02J 7/0029; H02J 7/0047; H02J 7/0063; H02J 7/008; H02J 7/0068; H05B 45/37; G05F 1/67; H02S 40/38; H02S 50/00; H02S 10/40; Y02B 10/10; Y02E 70/30; Y02E 10/56
See application file for complete search history.

(56) References Cited

U.S. PATENT DOCUMENTS

| | | | |
|---|---|---|---|
| 5,751,133 A | 5/1998 | Sato et al. | |
| 8,203,237 B1 * | 6/2012 | Cowles | .................. H02S 20/30 307/150 |
| 9,548,626 B1 | 1/2017 | Ramirez et al. | |
| 9,865,903 B1 * | 1/2018 | Petrella | .............. H01M 10/465 |
| 9,948,123 B2 * | 4/2018 | Moellenberg | .......... H05B 45/37 |
| 10,153,657 B1 * | 12/2018 | Koifman | ................ H02S 10/40 |
| 10,478,261 B2 * | 11/2019 | Demers | ................ B65D 5/0085 |
| 10,951,058 B2 * | 3/2021 | Libra | .................... H02J 7/0026 |
| 10,965,134 B2 | 3/2021 | Moellenberg et al. | |
| 2005/0252546 A1 | 11/2005 | Sasaki | |
| 2008/0007220 A1 | 1/2008 | Bolgiani et al. | |

(Continued)

OTHER PUBLICATIONS

U.S. Office Action dated Nov. 4, 2016 issued in U.S. Appl. No. 14/177,912.

(Continued)

*Primary Examiner* — Nha T Nguyen
(74) *Attorney, Agent, or Firm* — Weaver Austin Villeneuve & Sampson LLP

(57) ABSTRACT

A Solar Suitcase is described which is a self-contained solar electric power system, capable of powering lights, cell phones, and other basic electronics for medical clinics lacking access to electricity. The system includes a solar panel (for mounting on the clinic's roof), medical-grade lights, and a suitcase which contains the controlling electronics and energy storage battery.

19 Claims, 20 Drawing Sheets

(56) References Cited

U.S. PATENT DOCUMENTS

| | | | |
|---|---|---|---|
| 2008/0029153 A1* | 2/2008 | Margalit | H02J 7/0047 |
| | | | 136/252 |
| 2008/0224652 A1 | 9/2008 | Zhu et al. | |
| 2009/0039705 A1* | 2/2009 | Lyman | H02S 30/20 |
| | | | 307/64 |
| 2009/0230783 A1* | 9/2009 | Weed | H02J 7/35 |
| | | | 307/150 |
| 2010/0207571 A1 | 8/2010 | English et al. | |
| 2010/0244573 A1 | 9/2010 | Karnick et al. | |
| 2011/0006905 A1 | 1/2011 | Masuda | |
| 2011/0146751 A1* | 6/2011 | McGuire | F24S 30/425 |
| | | | 136/245 |
| 2011/0163682 A1 | 7/2011 | Jungwirth | |
| 2012/0091943 A1 | 4/2012 | Manor et al. | |
| 2012/0146572 A1 | 6/2012 | Ward | |
| 2012/0169269 A1 | 7/2012 | Liu et al. | |
| 2012/0187761 A1* | 7/2012 | Yanagi | H01M 10/44 |
| | | | 307/29 |
| 2013/0023741 A1* | 1/2013 | Ayanruoh | A61B 5/0077 |
| | | | 600/301 |
| 2013/0057196 A1 | 3/2013 | Ku et al. | |
| 2013/0099721 A1 | 4/2013 | Azzam et al. | |
| 2013/0257346 A1 | 10/2013 | Jakins et al. | |
| 2014/0062381 A1 | 3/2014 | Teggatz et al. | |
| 2015/0230306 A1* | 8/2015 | Moellenberg | H02J 7/0072 |
| | | | 307/24 |
| 2016/0219664 A1* | 7/2016 | Ellenberger | H05B 45/10 |
| 2016/0373054 A1* | 12/2016 | Wang | H02S 40/38 |
| 2017/0318922 A1* | 11/2017 | Gharabegian | B60L 53/51 |
| 2017/0331162 A1* | 11/2017 | Clarke | H02J 7/00714 |
| 2018/0131214 A1 | 5/2018 | Moellenberg et al. | |
| 2018/0289120 A1* | 10/2018 | Gharabegian | H05B 47/175 |
| 2018/0366789 A1* | 12/2018 | Petrella | H01M 10/441 |
| 2018/0369599 A1* | 12/2018 | Smith | A61N 1/3904 |
| 2019/0036359 A1* | 1/2019 | Smith | H02S 10/20 |

OTHER PUBLICATIONS

U.S. Notice of Allowance dated Feb. 28, 2017 issued in U.S. Appl. No. 14/177,912.

U.S. Office Action dated Oct. 31, 2019 issued in U.S. Appl. No. 15/808,761.

U.S. Final Office Action dated Jul. 7, 2020 issued in U.S. Appl. No. 15/808,761.

U.S. Notice of Allowance dated Dec. 18, 2020 issued in U.S. Appl. No. 15/808,761.

U.S. Appl. No. 17/249,202, filed Feb. 23, 2021, Moellenberg et al.

* cited by examiner

PORTABLE SOLAR POWER MANAGEMENT SYSTEM

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Portable systems for energy management are described and, in particular, portable systems for capturing and managing solar energy.

Many parts of the world still lack reliable sources of electricity for supporting essential health care services (e.g., mid-wife services or other emergency medical services) after dark. A reliable source of electricity is essential to provide adequate lighting for patient examination and power to operate simple diagnostic devices or to perform simple medical procedures. In some cases, diesel or gasoline-powered local generators are used. However, such systems are not only costly to acquire and maintain, their operations also depend on fuel being reliably accessible and available, which is often not the case. In addition, these local generation systems require some level of expertise to operate, which may not be readily available in many locations. Consequently, such local generation systems are seldom efficiently used, or are able to remain serviceable over even a significant fraction of their expected lifespan. These local generation systems also require the facility to provide infrastructure support (e.g., semi-permanent wiring), as they are not portable. Thus, the fact still remains that after-dark essential health care services are denied to many communities because of a lack of reliable source of electricity.

SUMMARY

According to various implementations enabled by the present disclosure, portable power management systems are provided. According to a particular class of implementations, a portable power management system includes an energy storage device, a solar array connection port, and one or more power delivery ports. Each power delivery port is configured for connection to a corresponding known load type. The system also includes one or more expansion ports. Each expansion port has associated load sensing circuitry configured to detect each of a plurality of external load types that may be connected to the expansion port. The system also includes control circuitry configured to control charging of the energy storage device using power received from one or more solar panels via the solar array connection port. The control circuitry is also configured to control delivery of power from the energy storage device to each power delivery port using one or more known load control methods corresponding to the one or more known load types. The control circuitry is also configured to control delivery of power from the energy storage device to each expansion port using one of a plurality of external load control methods depending on the external load type detected by the sensing circuitry of each expansion port. The system also includes memory configured to store performance data generated by the control circuitry relating to charging of the energy storage device and delivery of power via the one or more power delivery ports and the one or more expansion ports.

The system also includes wireless communication circuitry configured to transmit the performance data to a remote system, and to receive update information for reconfiguring the control circuitry.

According to a specific implementation, each of the external load control methods includes an overcurrent level and power on/off criterion for the corresponding external load type. According to a more specific implementation, the power on/off criterion corresponds to one of (1) always on, (2) on only when a voltage of the one or more solar panels is below a voltage threshold, or (3) on only when a charge level of the energy storage device is above a charge threshold.

According to a specific implementation, the sensing circuitry of each expansion port is also configured to sense an external voltage associated with a connected external load, and the external voltage is included in the performance data. According to a more specific implementation, the sensing circuitry of each expansion port is user-configurable to sense the external voltage.

According to a specific implementation, the performance data include one or more of (1) system temperature, (2) one or more voltages of the energy storage device, (3) load current for each of the one or more power delivery ports and each of the one or more expansion ports, (4) one or more voltages of the one or more solar panels, (5) one or more currents of the one or more solar panels, (6) daily power generated by the one or more solar panels, (7) daily maximum and minimum voltages and/or currents for a plurality of system nodes, (8) system errors, or (9) user activity.

According to a specific implementation, the control circuitry is further configured to adjust a rate at which the performance data are generated.

According to a specific implementation, the system includes a user interface configured to generate a representation of power flowing into and out of the energy storage device, and to generate a representation of which of the one or more power delivery ports and the one or more expansion ports are using power. According to a more specific implementation, the user interface is also configured to generate a representation of messages received via the wireless communication circuitry.

According to a specific implementation, the control circuitry is configured to control charging of the energy storage device using a maximum power-point tracking (MPPT) solar charge controller.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Various implementations of portable solar power management systems are described that receive and store solar energy in the day time, and which dispense power during the day and after dark. Such portable power management systems are suitable for use, for example, at small to medium size health centers (HCs) in certain parts of the developing world. Typically, such an HC may be on or off a power grid. A solar power management system enabled by the present disclosure may be relied upon as a primary source of energy, a back-up system, or a cost-reduction device for a room in such a facility. In this disclosure, portable solar power management systems designed for maternal and child health (MCH) applications are used for illustrative purposes. In an MCH application, a portable solar power management system may provide sufficient power for illumination and sufficient power to perform labor and delivery services or Caesarian-section procedures. The scope of the present disclosure is, of course, not so limited.

Figure 1A:
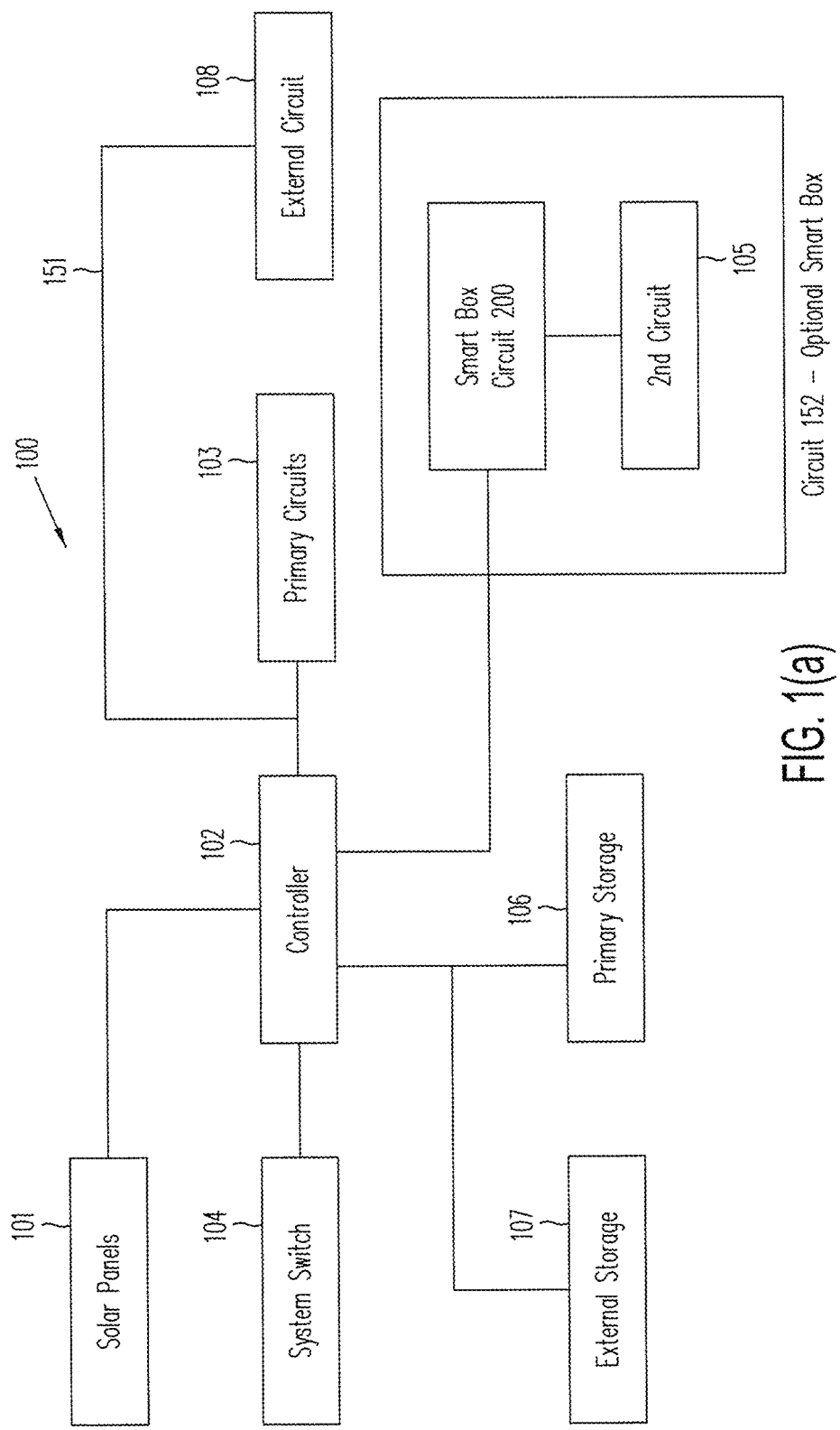
FIG. 1(a) shows a block diagram of portable power management system 100 in accordance with a particular implementation.

FIG. 1(a) shows a block diagram of portable power management system 100 in accordance with a particular implementation. Portable power management system 100 is designed to allow its components and selected accessories to be packed in a suitcase for portability. In one implementation, the suitcase measures approximately 20×16×8 inches and weighs about 35 pounds. In general, such a suitcase may be considered portable if it can be transported manually without difficulty using no more than two average able-bodied adults. As shown in FIG. 1(a), portable power management system 100 includes one or more solar panels 101 that are expected to be kept in the sunlight to capture solar power during operation and are also sized to fit in the suitcase during transportation. Each of solar panels 101 may be built using photovoltaic cells to provide a minimum output power of approximately 20 watts, at an output voltage of 12-50 volts DC. Under control of controller 102, output currents of the solar panels 101 may be used to charge energy storage devices 106 and 107. In one implementation, energy storage device 106 is a battery built into the suitcase, while storage device 107 may be an optional additional battery that can be connected to portable power management system 100. Each of storage devices 106 and 107 may be any of a variety of commercially-available batteries such as, for example, a sealed lead acid battery or a lithium iron phosphate battery. These batteries operate at approximately 12 volts. To prevent an over-voltage condition in the battery charging circuit, the input terminals of the batteries (and also the output terminals of solar panels 101) are limited by charge controller 102. When the battery is a type of lithium ion battery, a protective method to recover from battery over-discharge by "waking up" the battery may be provided as illustrated in detail by flow chart 400 of FIG. 4 which is discussed in further detail below. Other batteries may also be used, with controller 102 providing suitable control of the charging process.

The power stored in the batteries is used to supply power to circuits 151 and 152. Circuit 151 may be designed, for example, for supplying power to lighting. In one implementation, circuit 151 may provide high-efficiency, rugged and water-resistant light emitting diode (LED) lights. Typically, each such light may provide very bright white spectrum light (e.g., 5400K to 5600K) at 2-8 watts, suitable for medical procedure use. For some implementations, to inhibit other uses, circuit 151 only provides sockets for special lighting connectors (e.g., M12 light connectors). In FIG. 1(a), these sockets are represented by primary circuits 103. In one implementation, additional circuit sockets, represented by extension circuits 108, may be provided by connecting a satellite kit on which the additional sockets are mounted. The satellite kit may be used to provide lighting, for example, in an adjacent room without its own portable power management system.

Circuit 152 provides power to operate low-power electronic devices, such as handheld medical diagnostic devices, cellular telephones, and portable computers. As after-dark lighting is deemed more essential, circuit 200 is included to activate circuit 152 only when an adequate level of energy has been stored in the batteries. This operation is discussed in further detail below in conjunction with FIG. 5. Circuit 152 may supply power through various outlets of different convenient voltages, represented in FIG. 1(a) by secondary circuit 105. These power outlets may be, for example, automotive-type power outlets (e.g., 12 volts standard cigarette lighter sockets), 12-volt binding posts, and USB sockets. These sockets may supply power to communication or computation devices (e.g., cellular telephones, tablet or notebook computers, etc.), or medical or diagnostic equipment (e.g., portable fetal heart rate Doppler sensor, examination headlamps, blood pressure meters, etc.). Communication devices have become increasingly useful as diagnostic devices because remote diagnostic techniques have come into greater use.

Power switch 104 is prominently located to ensure easy access should system shut down be necessary under emergency conditions.

Controller 102 may also provide a user interface for communicating operational information regarding power management system 100. For example, portable power management system 100 may LED lights to indicate battery charging and battery charge status. In addition, a liquid crystal display (LCD) panel may also be provided to indicate, for example, the current output voltage of the batteries, the charging current from solar panels 101, and the output currents being drawn in circuits 103, 151, and 152.

Figure 1B:
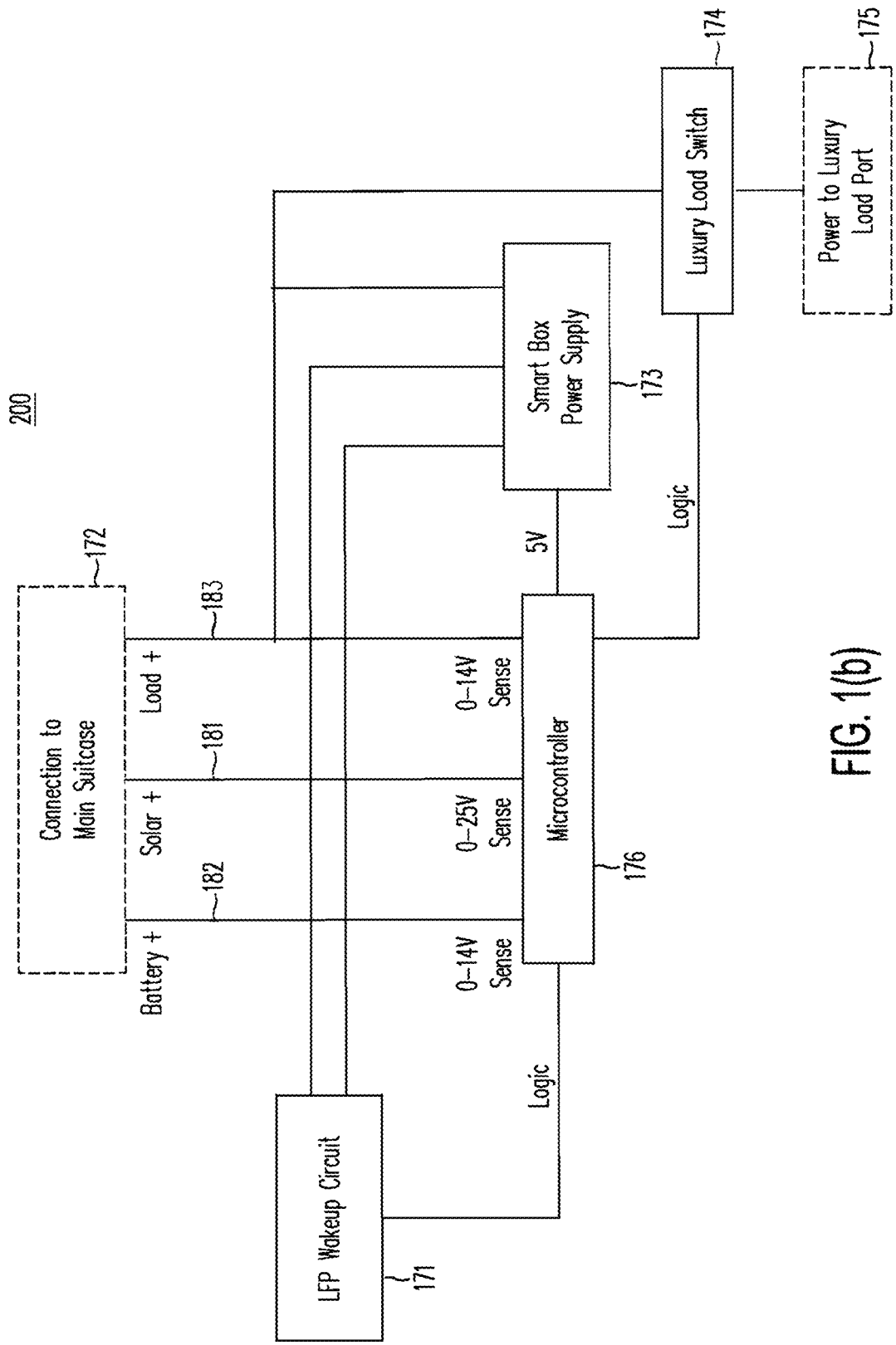
FIG. 1(b) shows a block diagram of circuit 200 which is an implementation of an optional plug-in accessory to circuit 152 of power management system 100.

Circuit 152 may include an optional "plug-in" accessory (referred to as a "smart box") that provides control to "luxury load" and to waking-up an over-discharged lithium ion battery. FIG. 1(*b*) is a block diagram of circuit 200, which is an implementation of such a smart box according to one implementation. As shown in FIG. 1(*b*), circuit 200 interfaces with circuit 152 through connector 172 which includes solar panel sensing signal 181, battery sensing signal 182, and load sensing signal 183. In one implementation, (i) solar panel sensing signal 181 indicates a voltage supplied by solar panels 101, which may be between 0 and 25 volts; (ii) battery sensing signal 182 indicates a voltage supplied by energy storage devices 106 or 107, which may be between 0 and 14 volts; and load sensing signal 183 indicates a voltage of load devices, which may be between 0 and 14 volts. The sensing signals are received by microcontroller 176, which controls lithium battery wake-up circuit 171 for waking-up an over-discharged lithium battery, and luxury load switch 174. Luxury load switch 174 activates circuit 152 in accordance with the load management method described below in conjunction with FIG. 5. Power supply circuit 163 provides a supply voltage to operate microcontroller 176. The operation of microcontroller 176 augments the control operations of controller 102 of FIG. 1(*a*).

Figure 2:
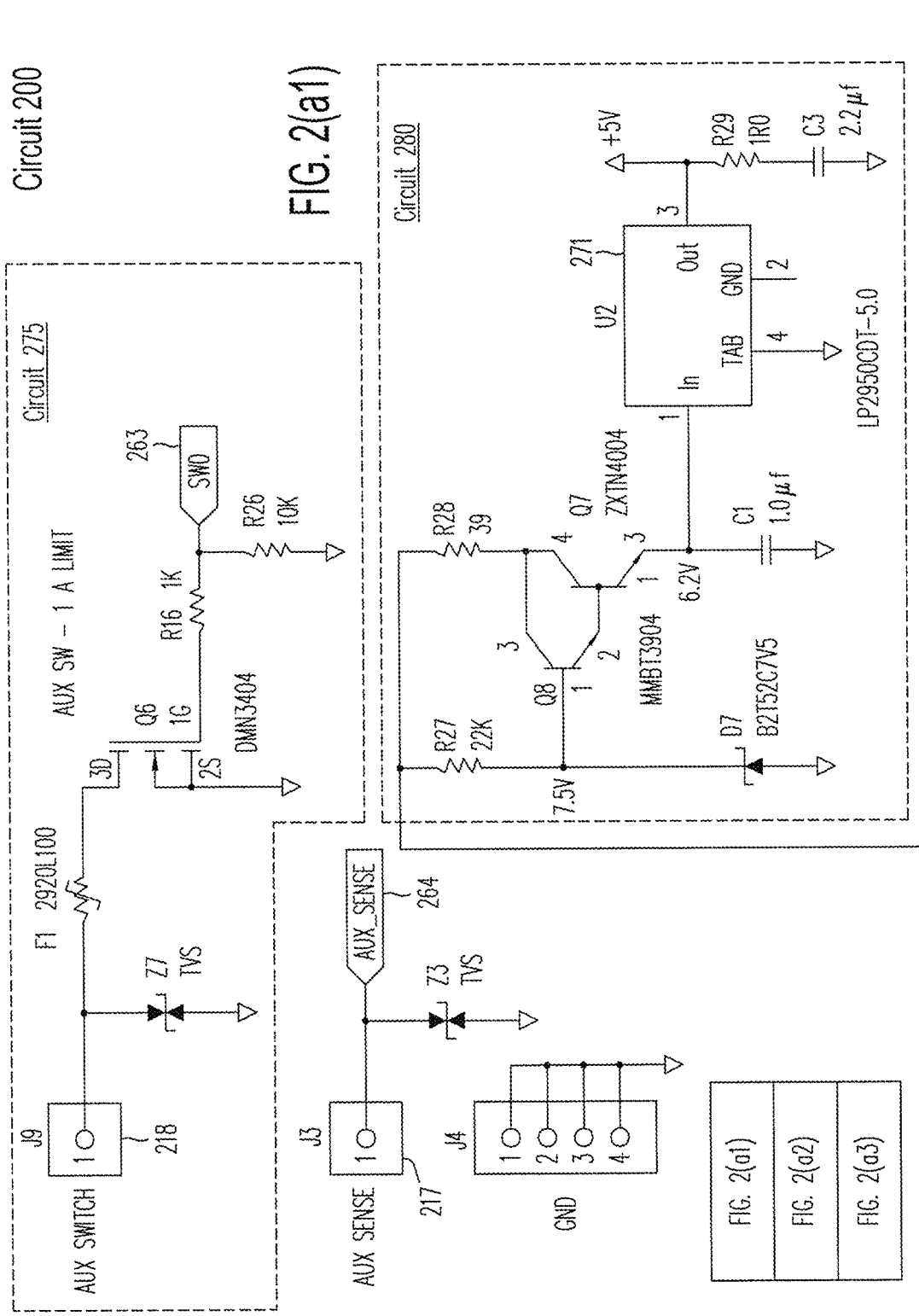
FIGS. 2(a1), 2(a2), 2(a3) and 2(b) show smart box circuit 200 in further detail schematically.
Figure 2:
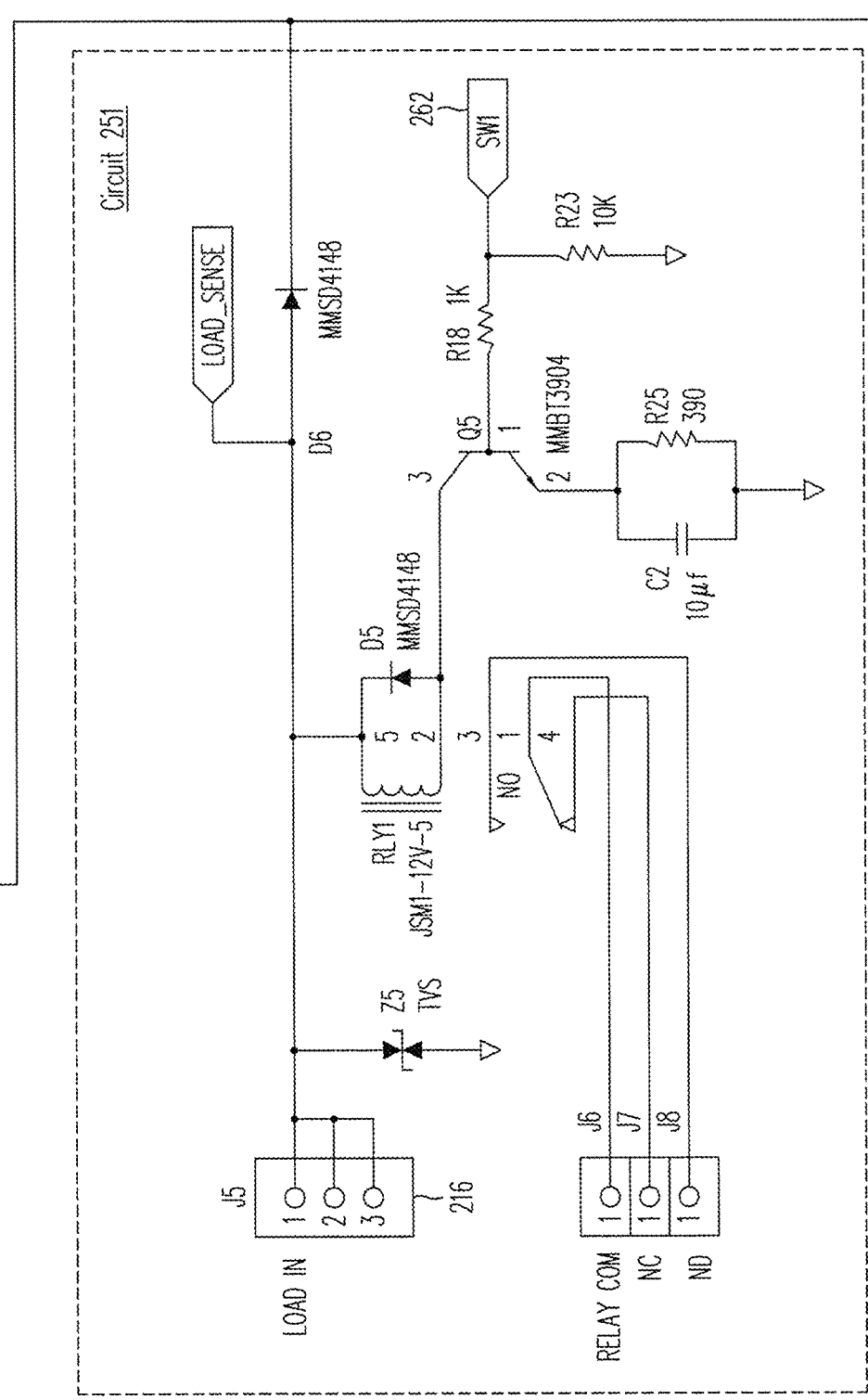
Figure 2:
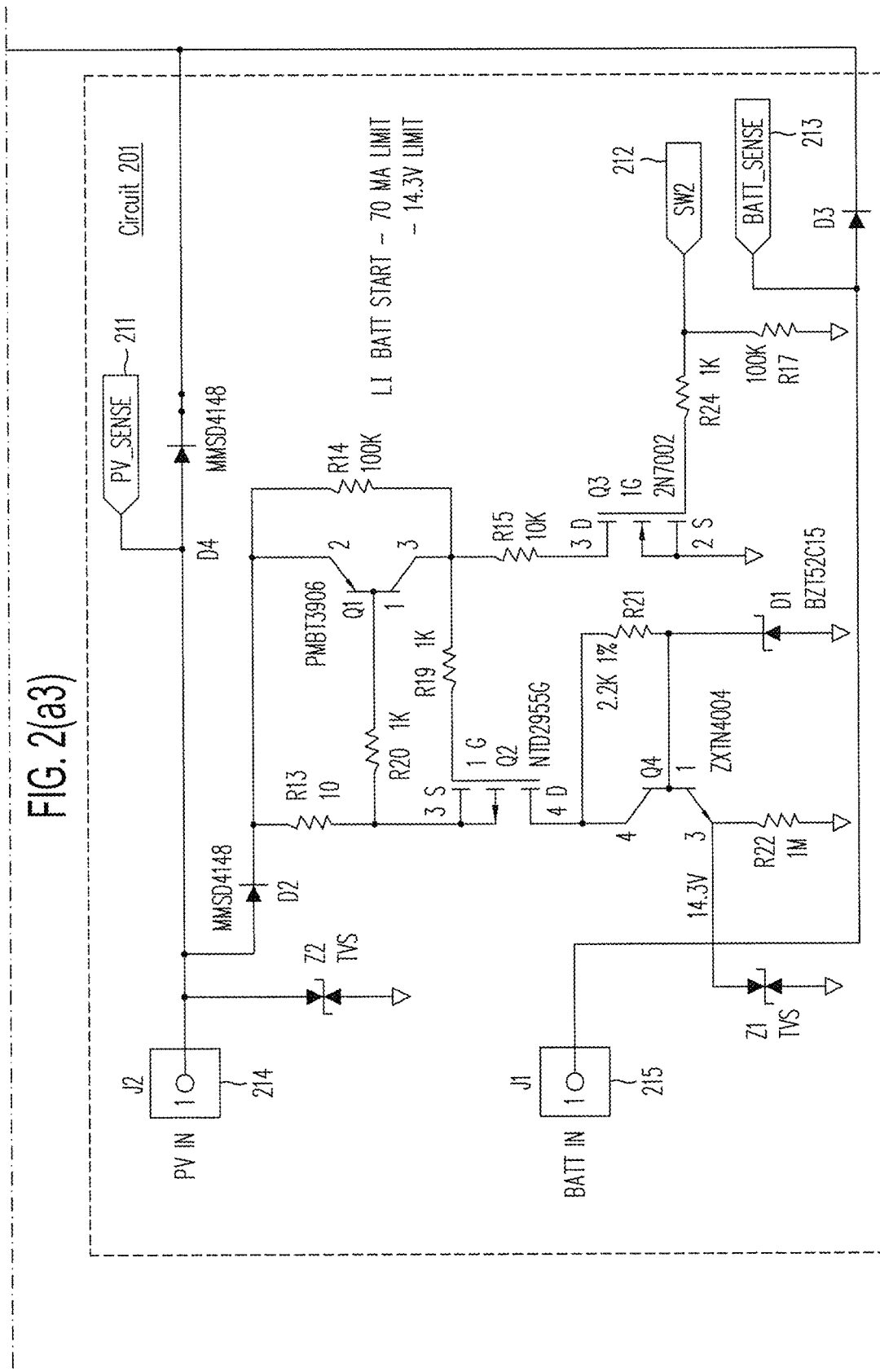
Figure 2B:
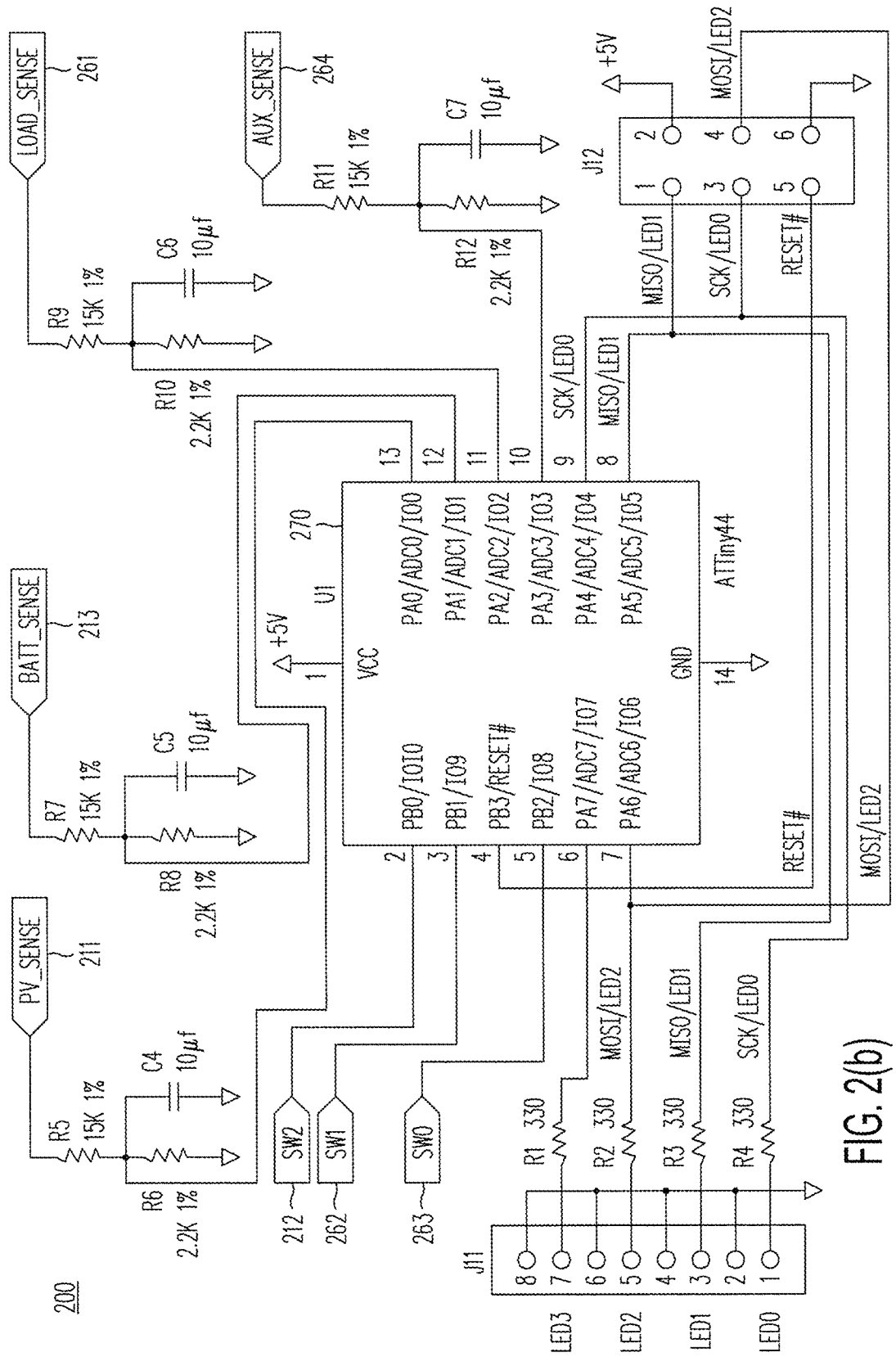
Figure 4:
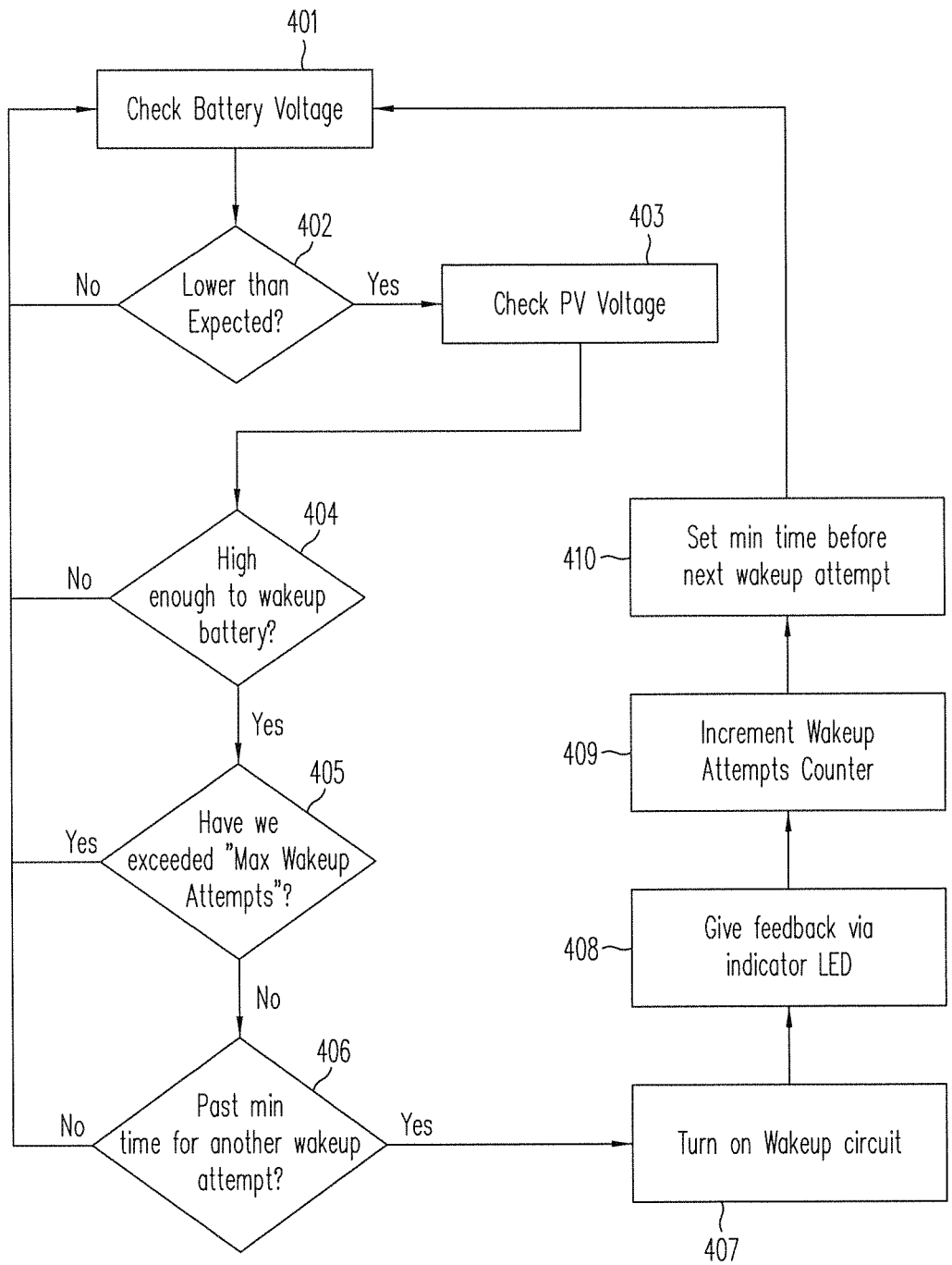
FIG. 4 illustrates a method executed in CPU 270 for asserting control signal 212 which activates battery charging circuit 201 in accordance with a particular implementation.

FIGS. 2(*a*1), 2(*a*2), 2(*a*3) and 2(*b*) show smart box circuit 200 in further detail schematically, in accordance with one implementation. FIG. 2(*b*) shows a programmable controller in circuit 200 which is implemented using central processing unit (CPU) 270. FIGS. 2(*a*1), 2(*a*2), and 2(*a*3) show the remainder of circuit 200, including lithium battery wakeup circuit 201, secondary load circuit 251 and auxiliary input circuit 275. As shown, battery wakeup circuit 201 is activated by control signal 212 (when conditions illustrated by flow chart 400 of FIG. 4 are met).

As shown in FIG. 2(*b*), after appropriate low pass filtering, CPU 270 receives sensing signals from (i) the batteries (at terminal 213), (ii) solar panels (at terminal 211), (iii) load circuit 251 (at terminal 261) and auxiliary input circuit 275 (at terminal 264), and sending out control signals to activate lithium battery wakeup circuit 201 (at terminal 212), the secondary load circuit (at terminal 262) and auxiliary input circuit (at terminal 263). As shown in FIGS. 2(*a*1), 2(*a*2), and 2(*a*3), each of the sensing signals is low-pass filtered to eliminate glitches. CPU 270 may be implemented, for example, by a microcontroller, such as the ATtiny44, available from Atmel Corporation, San Jose, Calif.

Secondary load circuit 105 ("luxury loads") receives power via secondary load circuit 251 only when solar panels 101 provides an output voltage at terminal 214 that is greater than the battery voltage at terminal 215. The voltage of solar panels 101 at terminal 215 and the voltage of the battery at terminal 215 are provided to CPU 270 at terminals 211 and 213, respectively, and are used in the algorithm depicted in flowchart 500 of FIG. 5. When conditions discussed in flowchart 500 are met, secondary load circuit 251 is activated by the control signal from CPU 270 at terminal 262, thereby enabling power to become available to circuit 105 (FIG. 1(*a*)).

Circuit 200 includes power circuit 280, which supplies the power necessary to operate circuit 200. Circuit 280 includes a buffer circuit which limits power loss over the wide range of input voltages from the solar power source. Circuit 280 may power circuit 280 from the load (terminal 216, solar panels (terminal 214), or the batteries (terminal 215).

Auxiliary circuit 275, which is activated by a control signal at terminal 263 from CPU 270, switches auxiliary loads as needed. Auxiliary sensing signal at terminal 217 may be an external input signal to circuit 200, which may be used in conjunction with or separately from auxiliary load circuit 275, as needed.

Figure 3A:
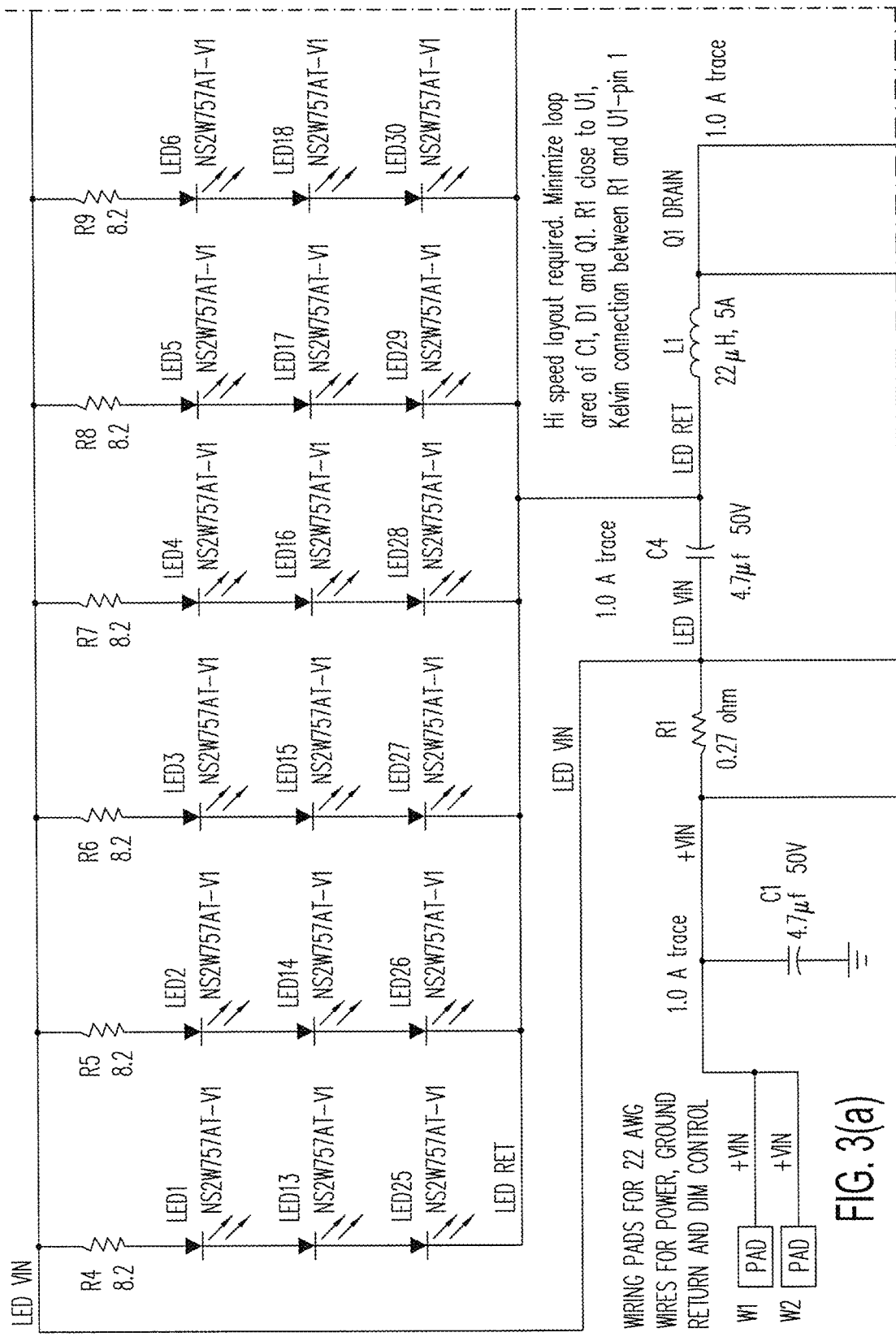
FIGS. 3(a), 3(b) and 3(c) show circuit 300 which represents an LED light that can be actively dimmed to under computer control in accordance with a particular implementation.
Figure 3B:
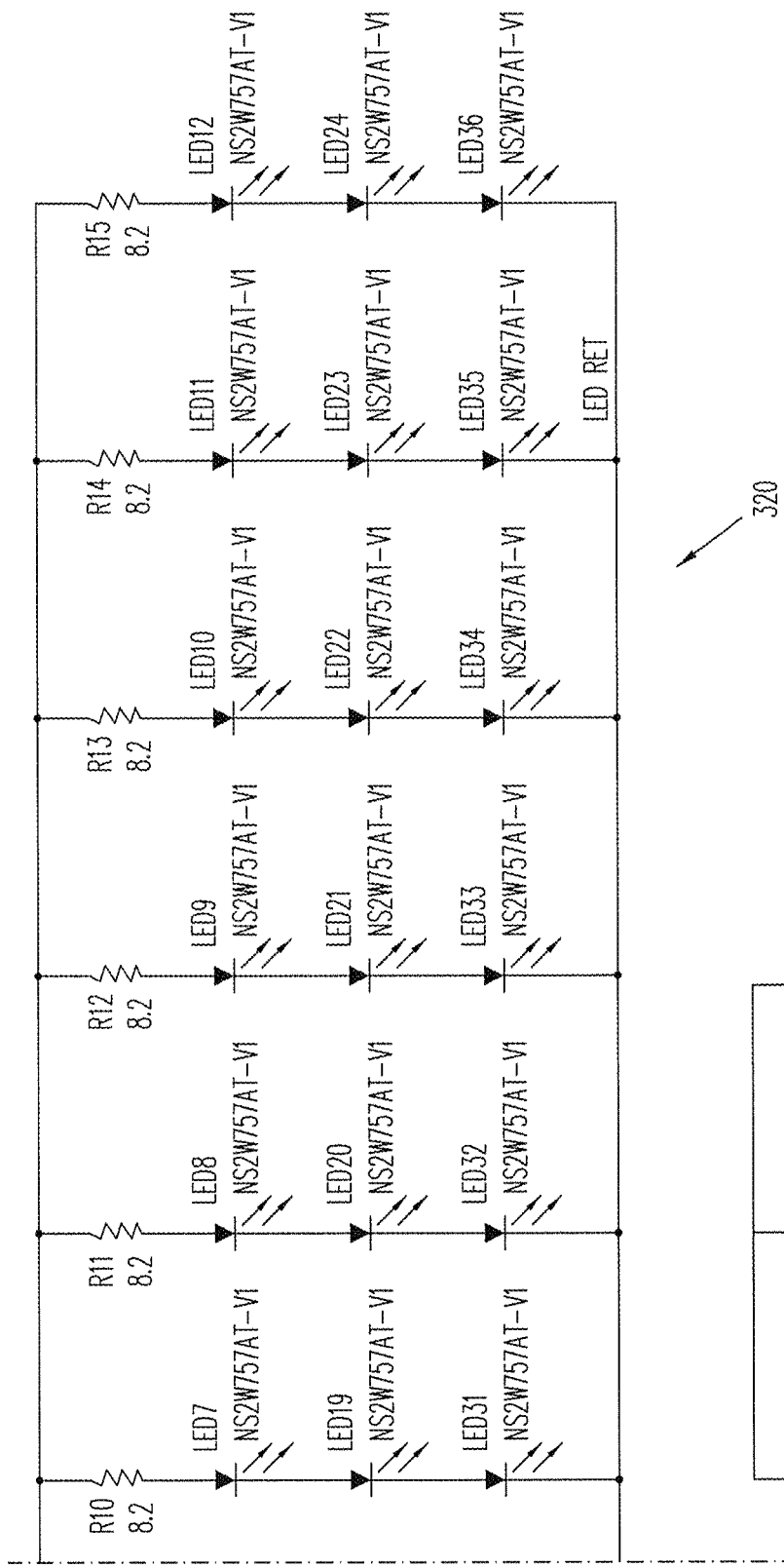
Figure 3C:
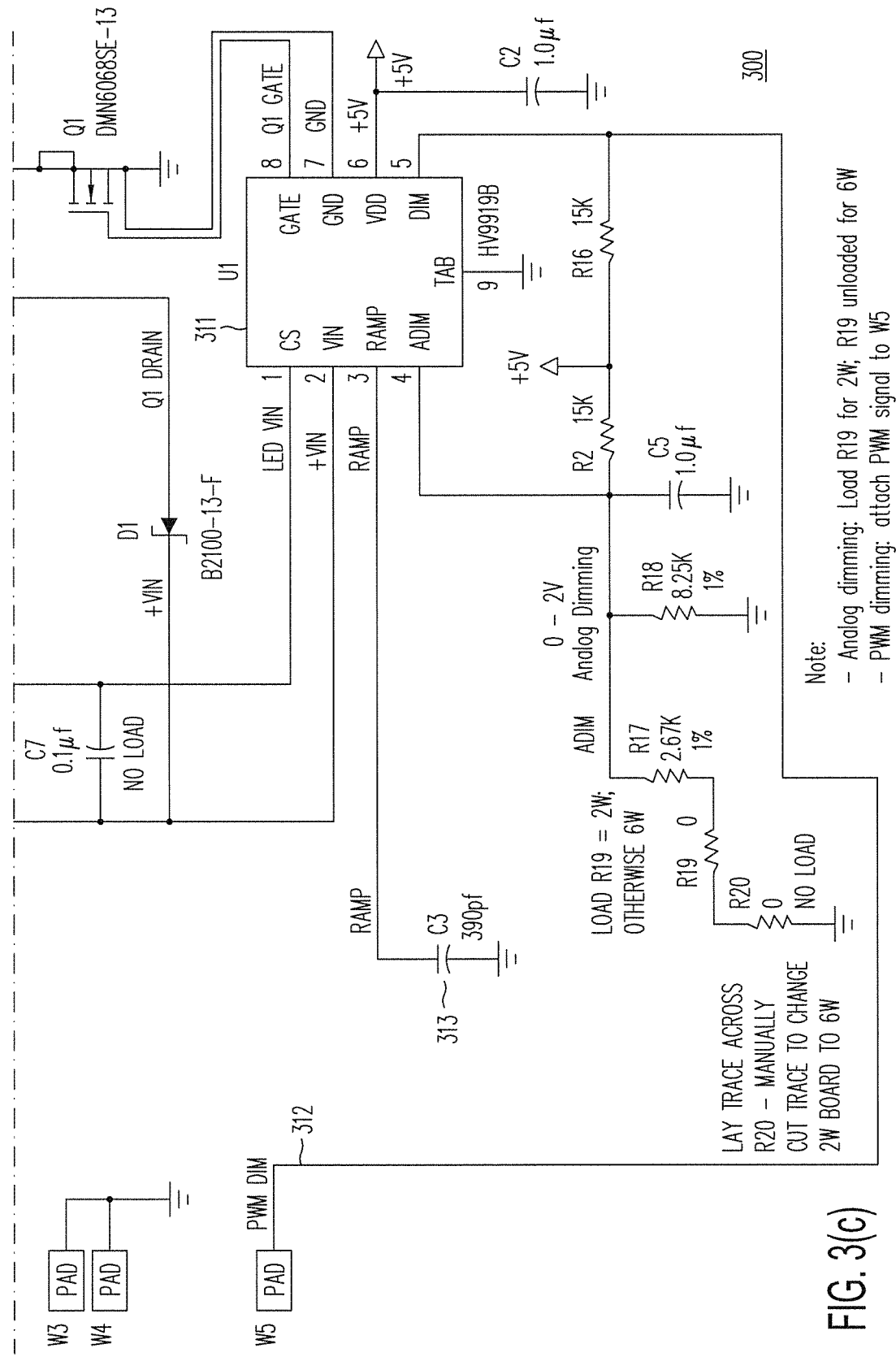

According to one implementation, an LED light that can be actively dimmed under computer control may be provided, as illustrated by circuit 300 FIGS. 3(*a*), 3(*b*), and 3(*c*). As shown, circuit 300 includes an array of LEDs 310 being controlled by high-brightness LED driver 311. High-brightness LED driver 311 may be provided, for example, by a high-brightness LED driver integrated circuit, such as the HV9919, available from Supertex Inc., Sunnyvale Calif., High-brightness LED driver 311 receives a pulse-width modulated (PWM) control signal at terminal 312 whose duty cycles control the brightness of LED 310. In addition, high-brightness LED driver 311 can be programmed using resistors R17, R18, R19, and R20 to provide a minimum brightness. CPU 270 may be programmed to provide the PWM controls signal at terminal 312.

FIGS. 6(*a*) and 6(*b*) show, respectively, back and front views of an LED light assembly 600, according to one implementation. As shown, light assembly 600 includes housing 650 and hanger 601. As shown in FIG. 6(*a*), back plate 602 provides a covering to housing 650. Housing 650 encloses a printed circuit board (PCB) on which numerous LED devices may be mounted. One example of such a PCB is provided by PCB 651 shown in FIG. 6(*d*). As shown in FIG. 6(*d*), PCB 651 includes, for example, a 3×12 array of LED devices, together with circuitry for driving the LEDs. PCB 651 may implement, for example, circuit 300 of FIG. 3. Cable assembly 604 electrically connects PCB 651 to circuit 151 of FIG. 1(*a*) via a through-hole in housing 650. FIG. 6(*c*) provides the back view of housing 650 with back plate 602 and PCB 651 removed. As shown in FIG. 6(*c*), housing 650 includes cavity 655 for accommodating PCB 651, with set-offs 652*a*-652*d* for mounting PCB 651. Back plate 602 may be a thermally conductive plate (e.g., anodized aluminum), which is designed to contact PCB 651 (e.g., press against a surface of PCB 651) to allow heat from the electronics and the LED devices to dissipate through back plate 602. As shown in FIG. 6(*a*), back plate 602 is formed with heat sink features (e.g., the parallel raised portions or ridges) to provide increased surface area, so as to facilitate heat dissipation. In one implementation, front surface 603 is integrally formed on housing 650 using a clear material (e.g., acrylic glass), so that front surface 603 may act as a lens for projection of light from the LED devices in the direction where illumination is desired. A proper treatment of front surface 603 may provide uniform and diffused light from the LED devices. Housing 650 includes through holes 602*a* and 602*b*, so that housing 650 may be fixedly mounted on a flat surface, such as a ceiling. Housing 650 also includes threaded hole 605 to allow housing 650 to be screw-mounted in a number of ways, such as a tripod or clamped on to a table top via a "clamp and flexible goose-neck" assembly.

As shown in FIGS. 6(*a*) and 6(*b*), housing 650 is attached to hanger 601, which is independently shown in FIG. 6(*e*). Hanger 601 allows LED assembly 600 to be relatively portable and be hung at any suitable height to provide illumination. As shown in FIG. 6(e), hanger 601 includes a curved portion for attachment to, for example, a horizontal hanger bar. Hanger 601 also includes arms 601a and 601b which extend to elbow portions 601c and 601d, respectively. Elbows 601c and 601d are designed to be inserted into corresponding openings provided on opposite sides of housing 650, as shown in FIGS. 6(a) and 6(b). In hanger 601's relaxed state, i.e., when not attached to housing 650, the distance between arms 601a and 601b at elbows 601c and 601d is slightly less than the distance between these openings of housing 650. Radiating from the openings on housing 650 where elbows 601c and 601d are to be attached is a pattern of groves. In FIGS. 6(a) and 6(b), the groves are labeled pattern 606. Each grove in pattern 606 is designed to accommodate one of the arms 601a and 601b. For example, when arms 601a and 601b are formed with a circular cross section, each grove is formed with a semi-circular cross section with a diameter matching the diameter of arms 601a and 601b. (Arms 601a and 601b need not have a circular cross section). To attach hanger 601 to housing 650, arms 601a and 601b are pulled apart slightly to insert elbows 601c and 601d into the corresponding openings on housing 650, so that a spring action in arms 601a and 601b provides a compressive force to secure arms 601a and 601b to their respective groves on housing 650, and thereby to lock housing 650 to a fixed position suitable for providing illumination from a desired angle. As shown in FIGS. 6(a) and 6(b), pattern 606 includes groves that are 45° apart, so that housing 650 may be fixed at any of eight different positions. For example, FIG. 6(f) shows housing 650 being fixed to one of the groves in pattern 606, with front surface 603 forming a 45° angle relative to arms 601a and 601b.

As mentioned above, FIG. 4 shows a method for recovering from an over-discharge condition of the battery. When a lithium ion battery pack is fully discharged, a conventional charging circuit may fail to recharge the battery. This is a situation frequently seen in an off-grid solar power system. Accordingly, circuit 200 has built-in lithium ion battery waking up circuit 201 that allows circuit 200 to run on either battery power or solar power. When the lithium ion battery is fully depleted and is unable to be charged by the conventional charging circuit under control of controller 102, battery ion waking-up circuit 201 is energized to allow solar power to flow into the battery pack, until normal solar charging can resume.

As shown in FIG. 4, state 401 represents a monitoring step in which the battery's voltage is checked. At step 402, if the battery's voltage is found to have dropped below a predetermined threshold (e.g., 3 volts), the voltage at the output terminal of solar panels 101 is checked at step 403. If the voltage at the output terminal of solar panels 101 is found to be sufficiently high (i.e., exceeding a threshold above which battery charging is feasible), the method proceeds to step 405. Otherwise, the wake-up procedure is postponed until the next time the battery voltage is checked at step 401. At step 405, a "wake up attempt" counter is checked to determine if the battery has undergone more than a maximum number of wake-up attempts. (This maximum number is set to a value that should not be reached under normal usage conditions). If the battery has not reached this maximum number of wake-up attempts, the elapsed time since the last wake-up attempt is checked at step 406. A battery fault condition is indicated if the elapsed time between wake-up attempts is too short (i.e., the battery's voltage is dropping too quickly to the over-discharged state). The elapsed time may be determined, for example, from a down-counter set at the end of the last wake-up attempt. If the fault condition is not indicated, i.e., the down-counter has not reached zero, the wake-up procedure is initiated to bring the battery to the boosted voltage. Activation of the wake-up procedure is indicated by an LED controlled by circuit 200 at step 408. At step 409, the wake up attempt counter is incremented to account for the current attempt. At step 410, the down-counter is set at the minimum elapsed time between wake-up attempts.

Figure 5:
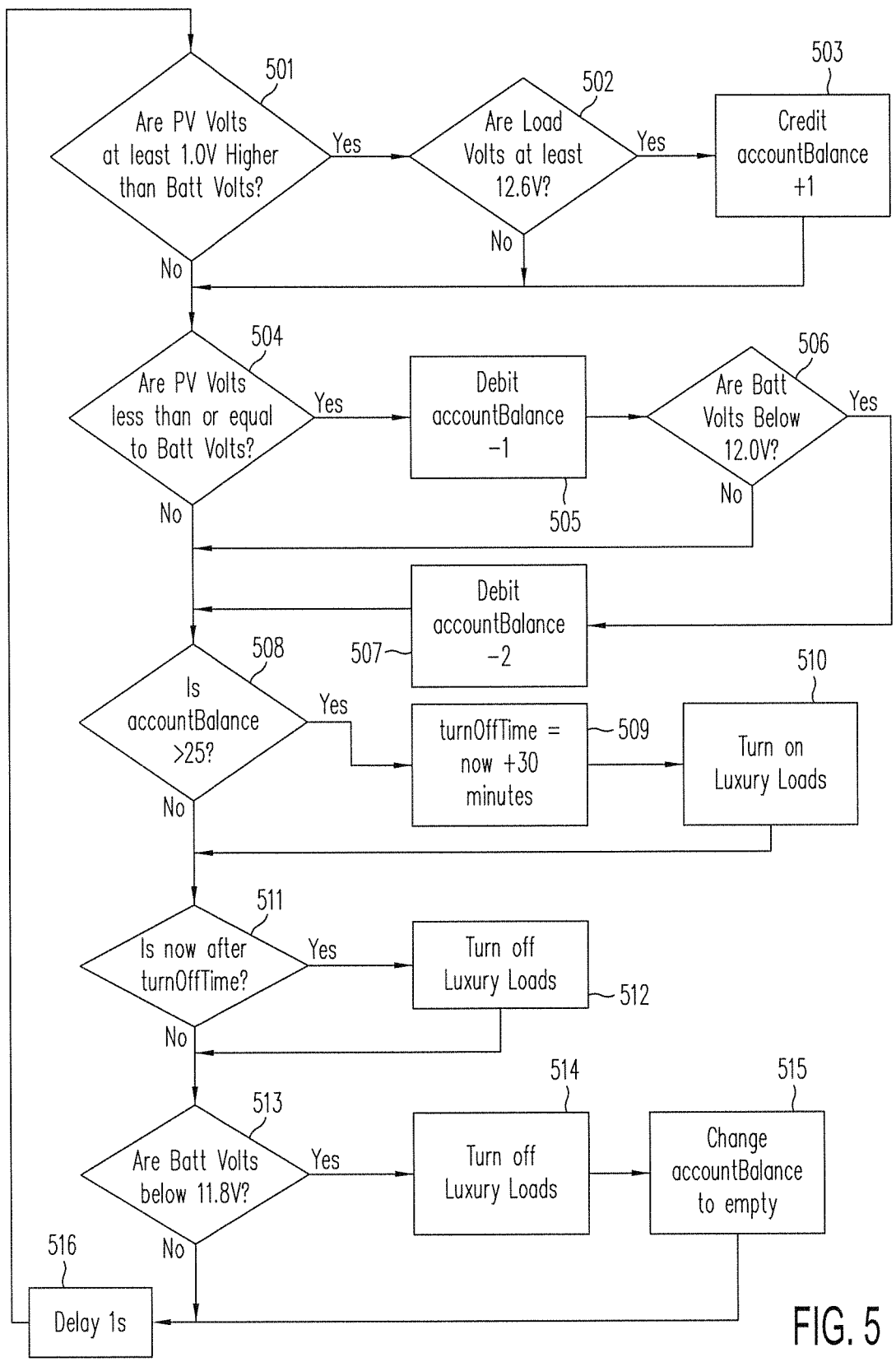
FIG. 5 illustrates a method for ensuring priority is given to using the battery's energy to provide lighting in accordance with a particular implementation.
Figure 6A:
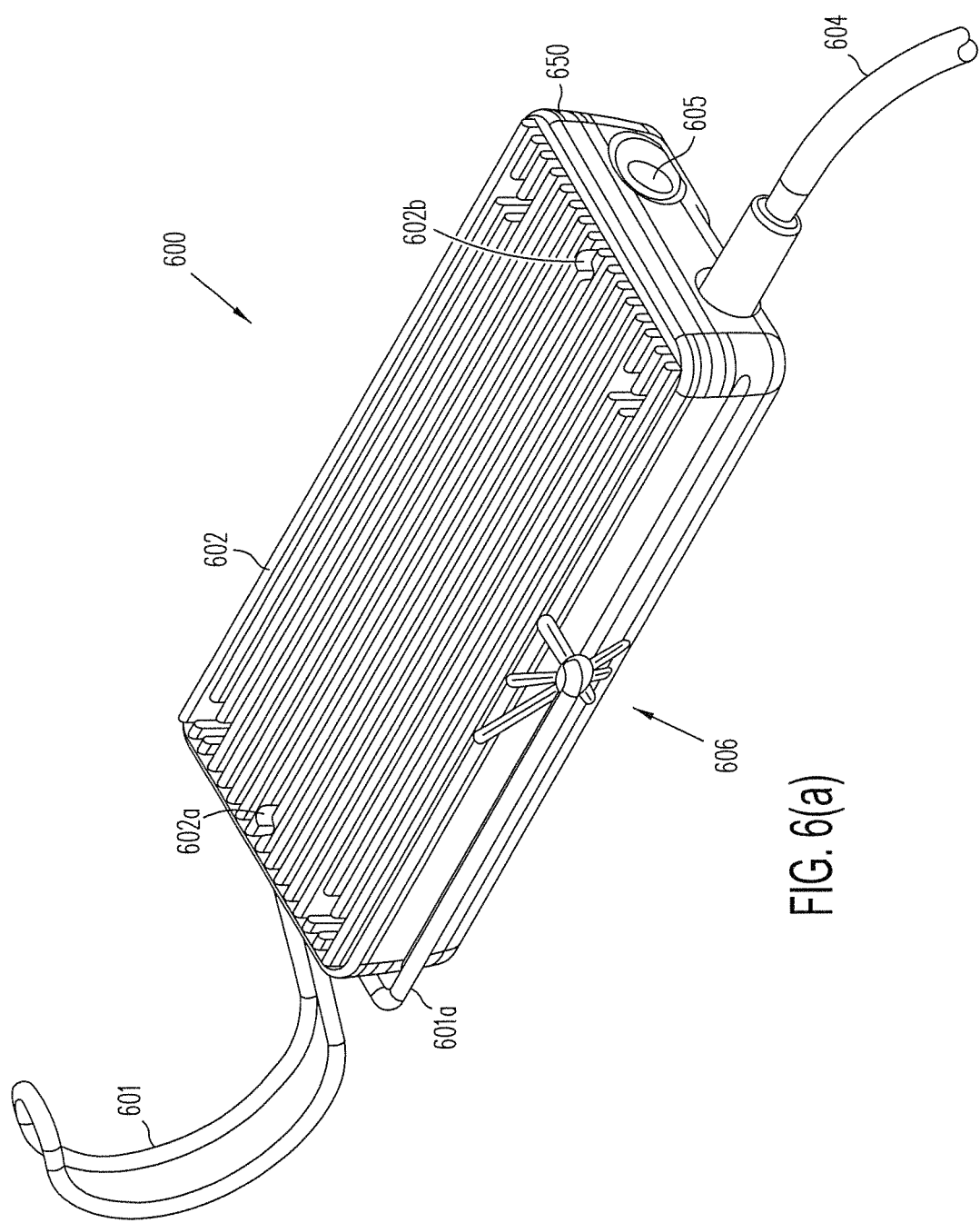
FIGS. 6(a) and 6(b) show, respectively, back and front views of an LED light assembly 600 according to a particular implementation.
Figure 6B:
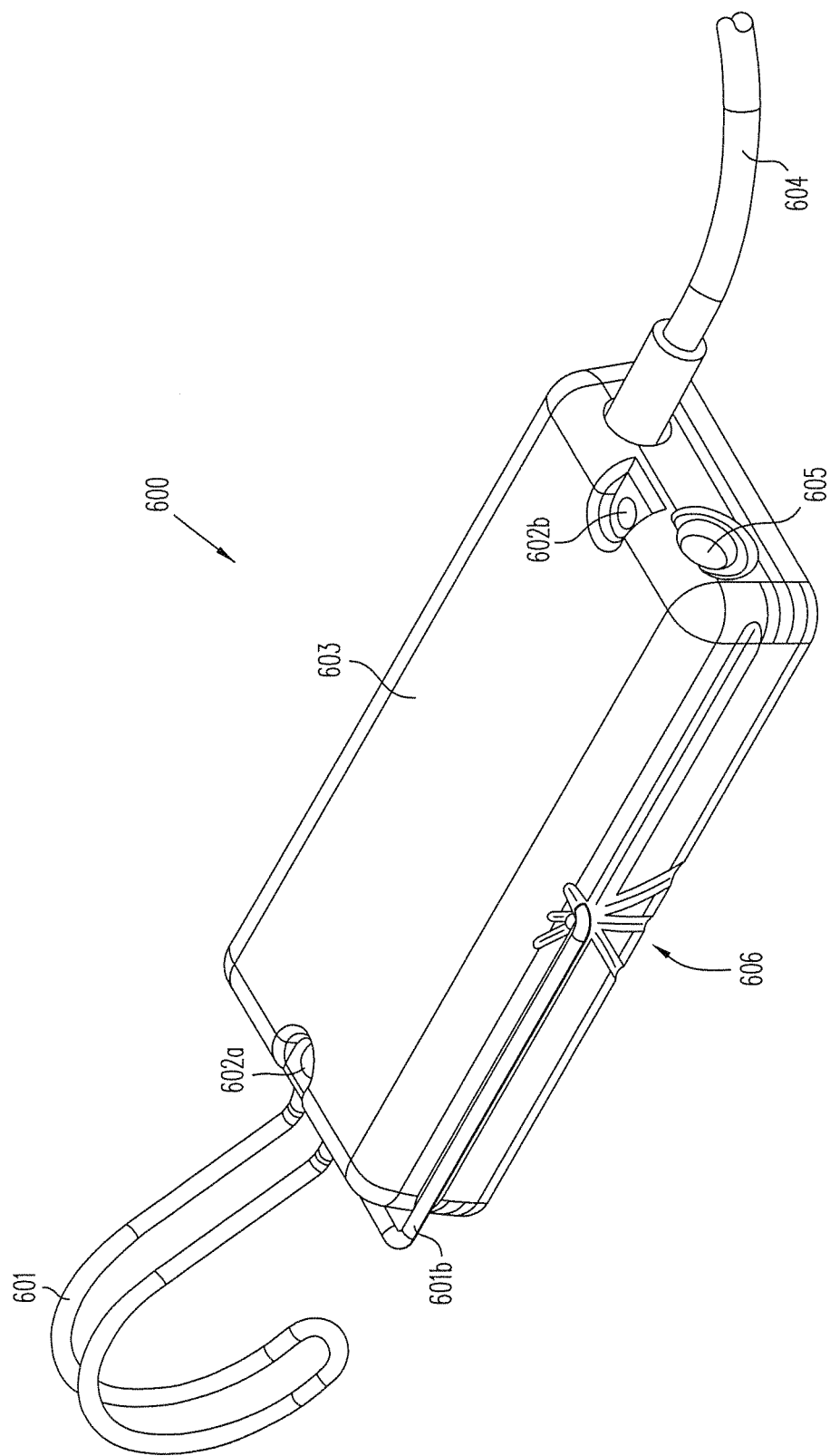
Figure 6C:
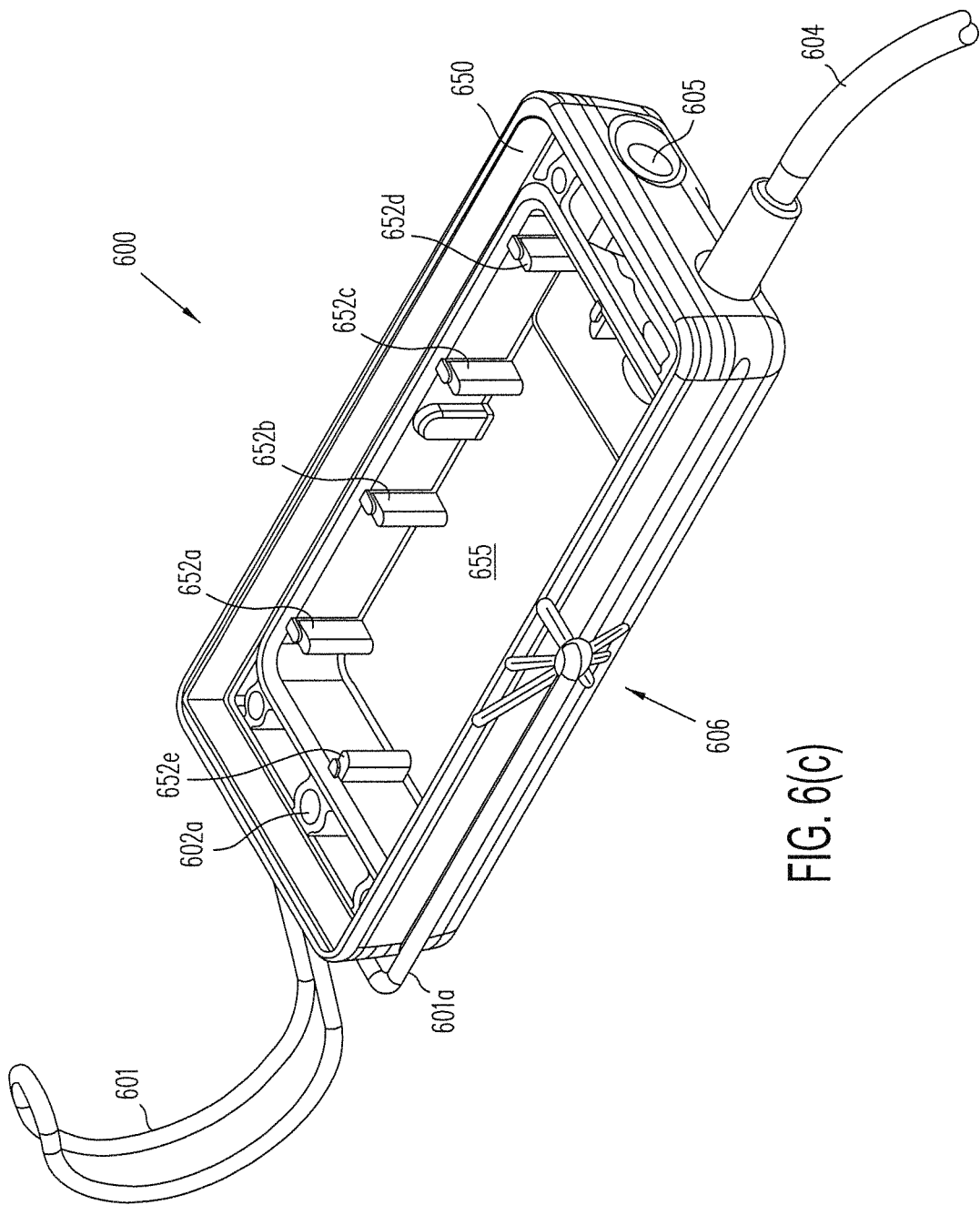
FIG. 6(c) provides the back view of housing 650 with back plate 602 and a printed circuit board (PCB) removed.
Figure 6D:
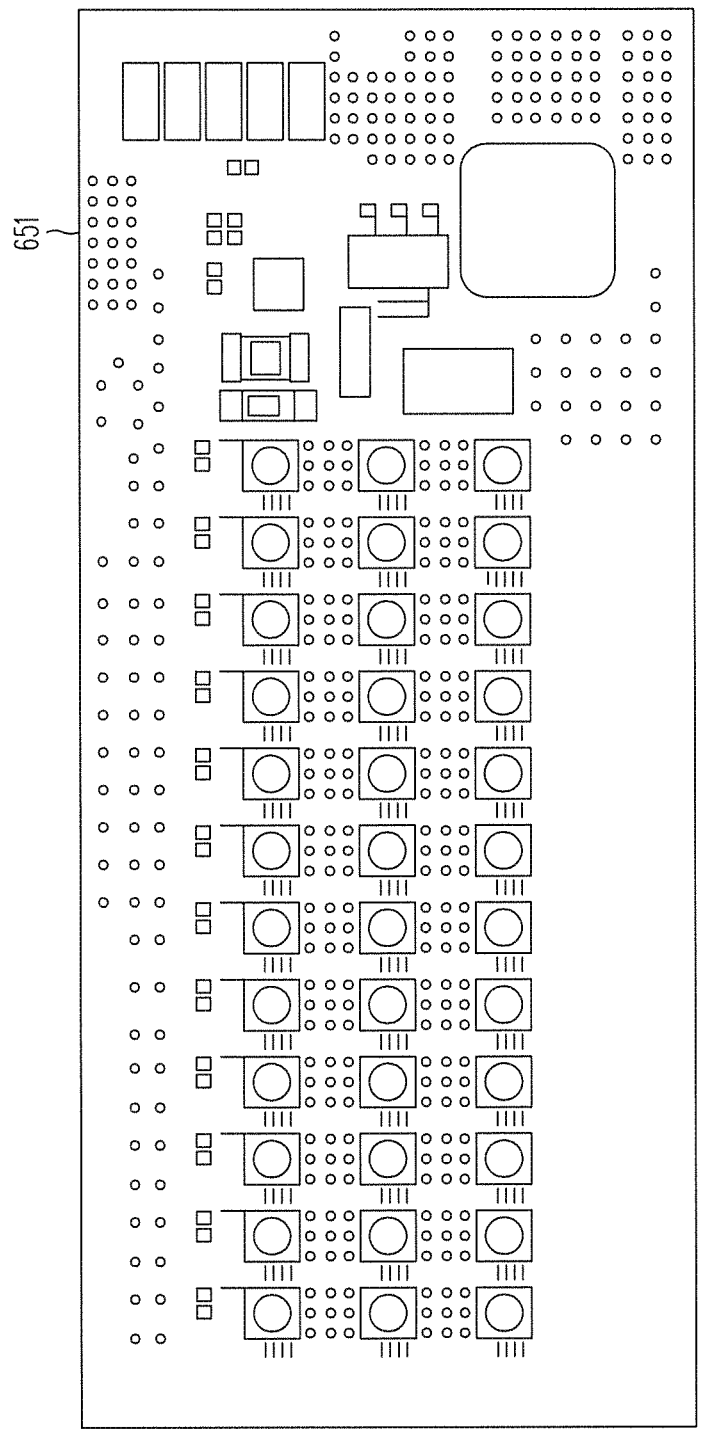
FIG. 6(d) shows PCB 651 on which numerous LED devices may be mounted; PCB 651 may be mounted on housing 650.
Figure 6E:
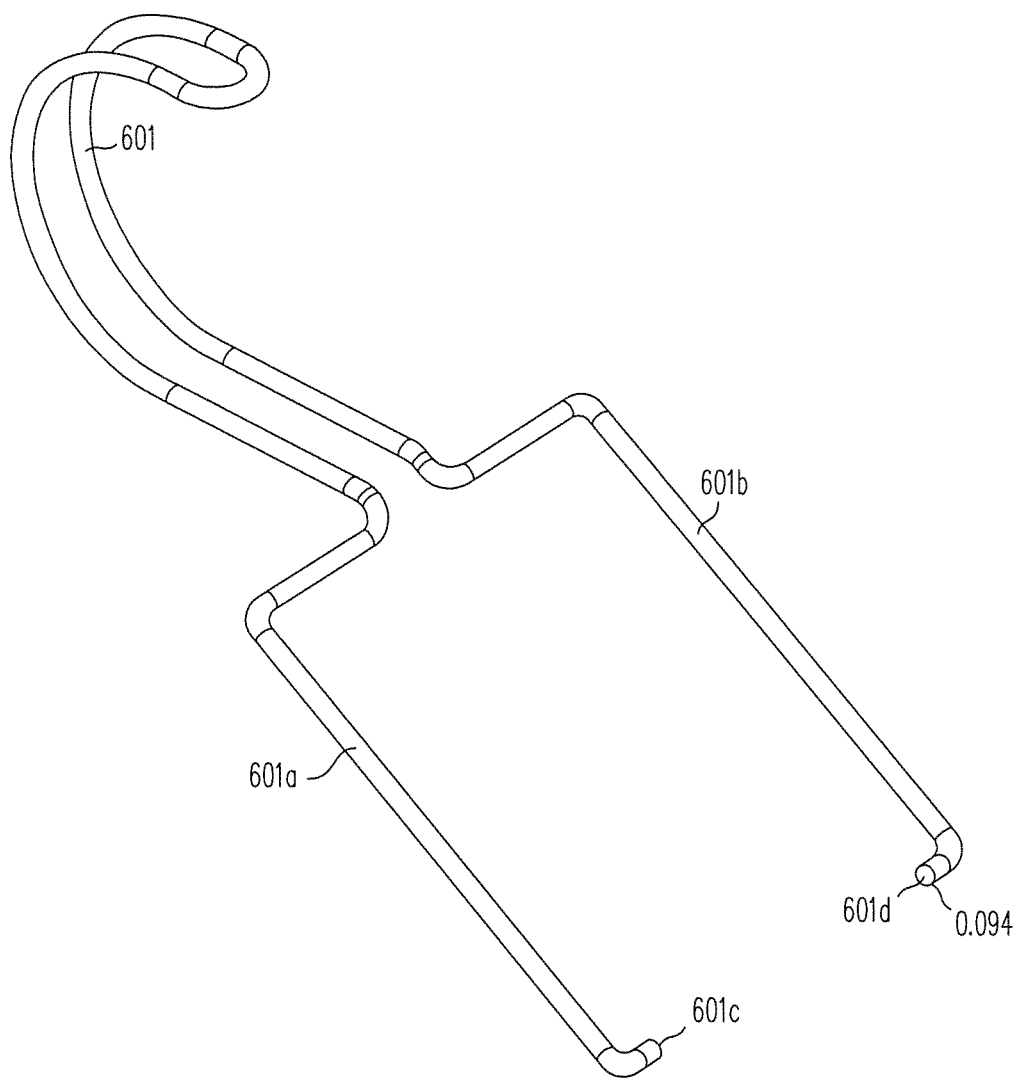
FIG. 6(e) shows hanger 601 by itself.
Figure 6F:
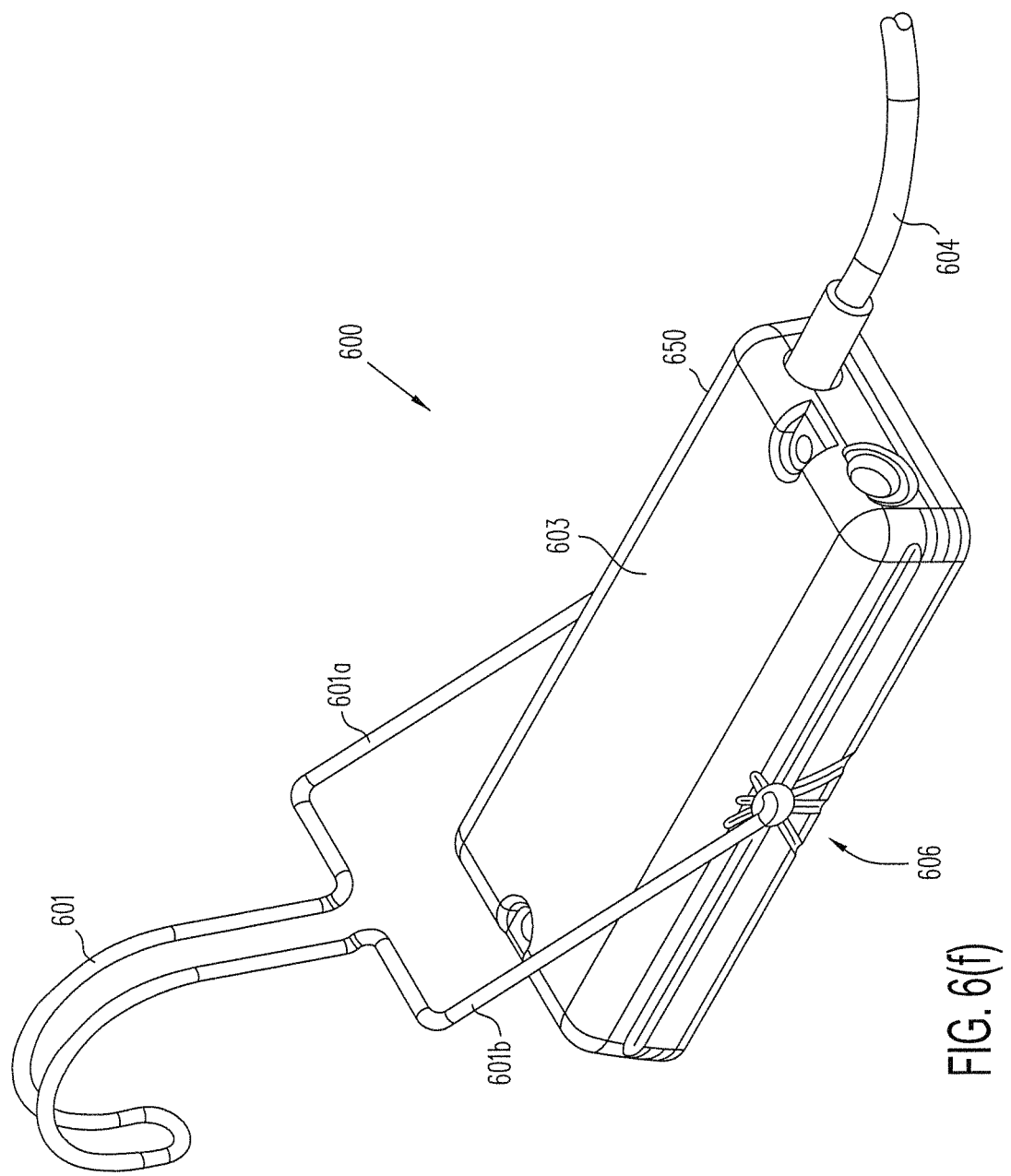
FIG. 6(f) shows housing 650 being fixed to one of the groves in pattern 606.

To ensure priority is given to using the battery's energy to provide lighting, a method that is based on a "power credit" system is provided in accordance with one implementation. This method is illustrated by flow chart 500 in FIG. 5. As shown in FIG. 5, at step 501, the solar panel's output voltage is checked to determine if it is at least one volt higher than the battery's voltage. The higher solar panel voltage—a favorable condition—indicates that battery charging is complete or nearly complete. If the solar panel voltage is favorable, at step 502, the voltage across the load is checked if it is at least a predetermined value (e.g., 12.6 volts). This ensures that the battery is full or nearly full. Under that condition, at step 503, a small value (e.g., 1) is added to a power credit account to indicate the favorable energy condition.

Next, step 504 determines if the solar panel voltage is actually less than the battery voltage. If so, a small value (e.g., 1) is deducted from the power credit account. At step 506, if the battery voltage is also less than, for example, 12 volts, a greater value (e.g., 2) is deducted from the power credit account.

At step 508, the power account balance is checked to see if there is sufficient power credit to allow non-lighting applications. For example, to allow non-lighting applications, the power credit account must have a value exceeding 25. At steps 509 and 510, the circuit supplying the non-lighting applications ("the luxury circuit") is activated for a predetermined time period (e.g., 30 minutes). Steps 511 and 512 deactivate secondary load circuit 251 at the end of the predetermined time period. At any time during the predetermined time period, step 513 determines if the battery voltage falls below a predetermined threshold (e.g., 11.5 volts). If so, secondary load circuit 251 is also deactivated (step 514) and the power credit account is set to zero (step 515), as the rapid battery voltage drop indicates an unfavorable condition. After a period of delay (e.g., one second, at step 516), the method returns to step 501.

In one implementation, a power management system may provide at least 220 watt-hours (wh) of power per day and up to about 1200 wh per day. In one implementation, one configuration of a power management system may be, for example:

|  | Descriptive power consumption | Daytime energy | Night time energy (wh) |
| --- | --- | --- | --- |
| Lights | 2 lights - 300 lumens - 12 hours per night 1 light-100 lumens-12 | 32 | 132 wh |
| Computer | 1 computer fully charged per day | 100 | 0 |
| Tablet | 1 tablet fully charged per day | 30 |  |
| Cell phones daytime | 5 dumb phones (5 wh) + 2 smart phones (15 wh) charged per day | 55 |  |
| Cell phones nighttime | 2 dumb phone | 0 | 10 wh |
| Fetal Doppler | Device charged for 3 uses per day; 30 minutes total | 2 |  |

-continued

| | Descriptive power consumption | Daytime energy | Night time energy (wh) |
|---|---|---|---|
| Headlamps | Rechargeable daily-use 2 Headlamps (total) (full battery | 20 | |
| Total | | 239 wh | 142 wh |

Some power management systems enabled by the present disclosure require little to no understanding by the user of the operation of a solar energy system, as key visual indicators are provided to inform the user whether or not the system is functioning properly and the level of power available. In addition, with the sensing signals provided to the controller, the controller can be easily programmed to provide a real time estimate of how much power remains at the current rate of power usage. The ability of a controller associated with some implementations to automatically vary the brightness of the lighting based on the instant power condition through the dimmer circuits allows efficient management of available power.

According to some implementations, a power management system is enabled that is a self-contained solar electric power system, capable of powering lights, cell phones, and other basic electronics in, for example, medical clinics lacking access to electricity. Such power management systems are also referred to herein as "Solar Suitcases." The Solar Suitcase includes a solar panel (configured to be mounted, for example, on a clinic's roof), medical-grade lights, and a carrying case, e.g., a suitcase, which contains the controlling electronics and energy storage battery.

Figure 7:
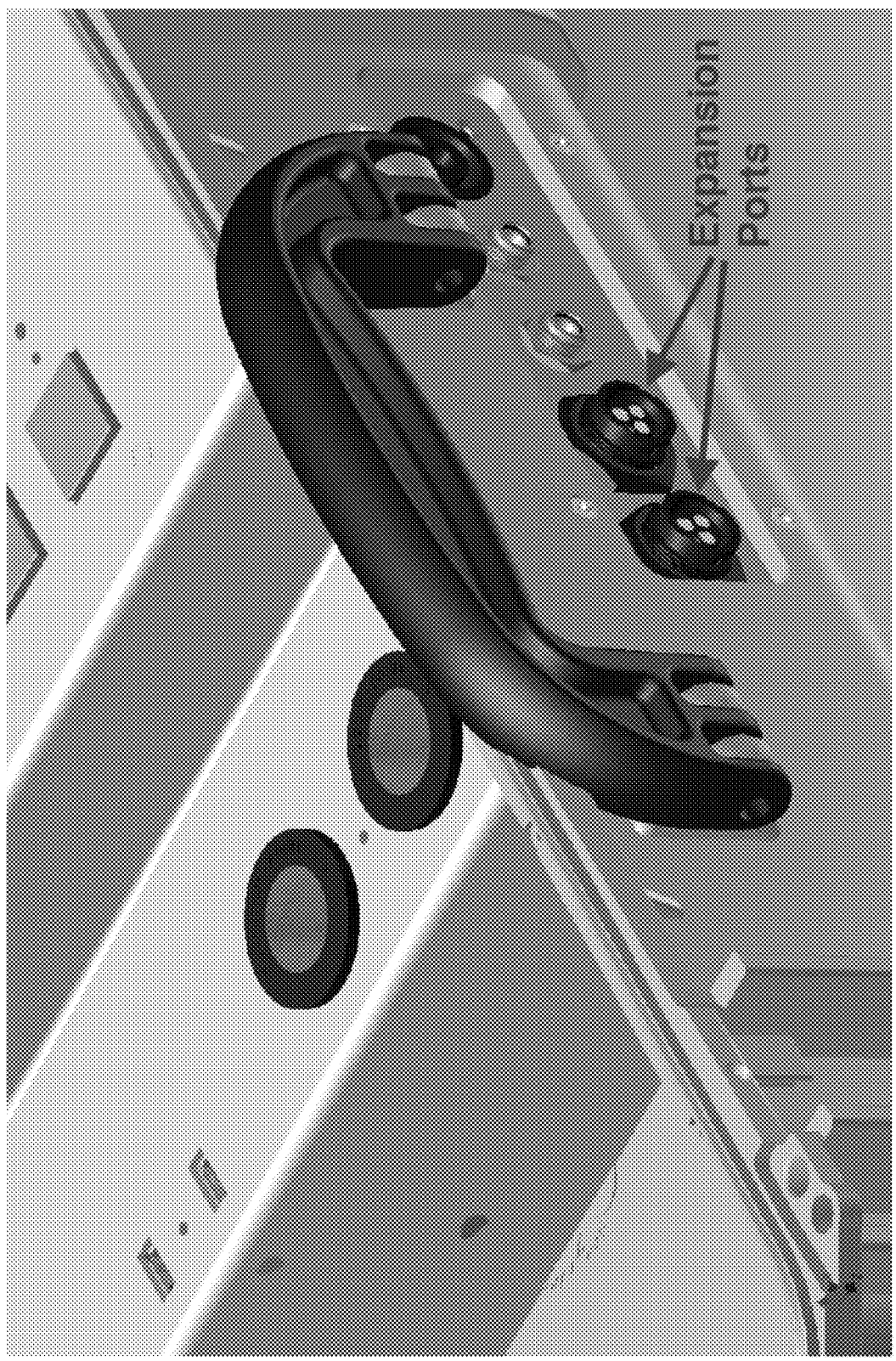
FIG. 7 shows examples of expansion ports for a portable power management system.
Figure 8:
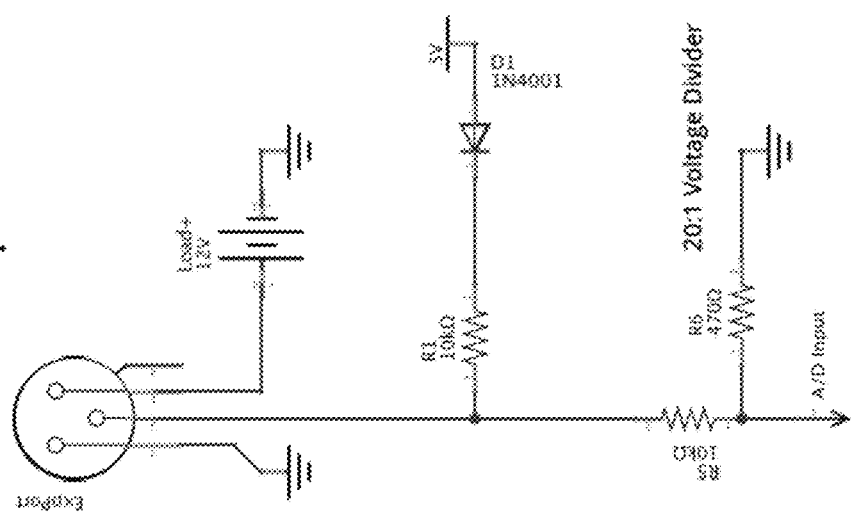
FIG. 8 shows examples of various cable options for expansion ports for a portable power management system.
Figure 8:
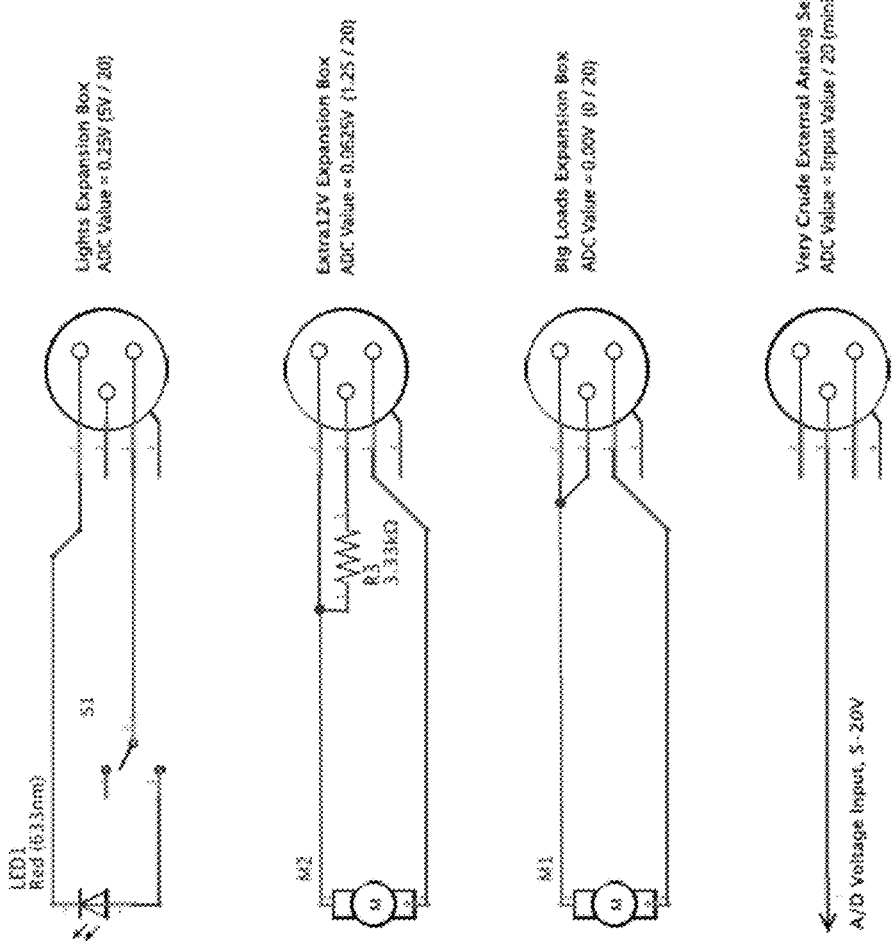
Figure 9:
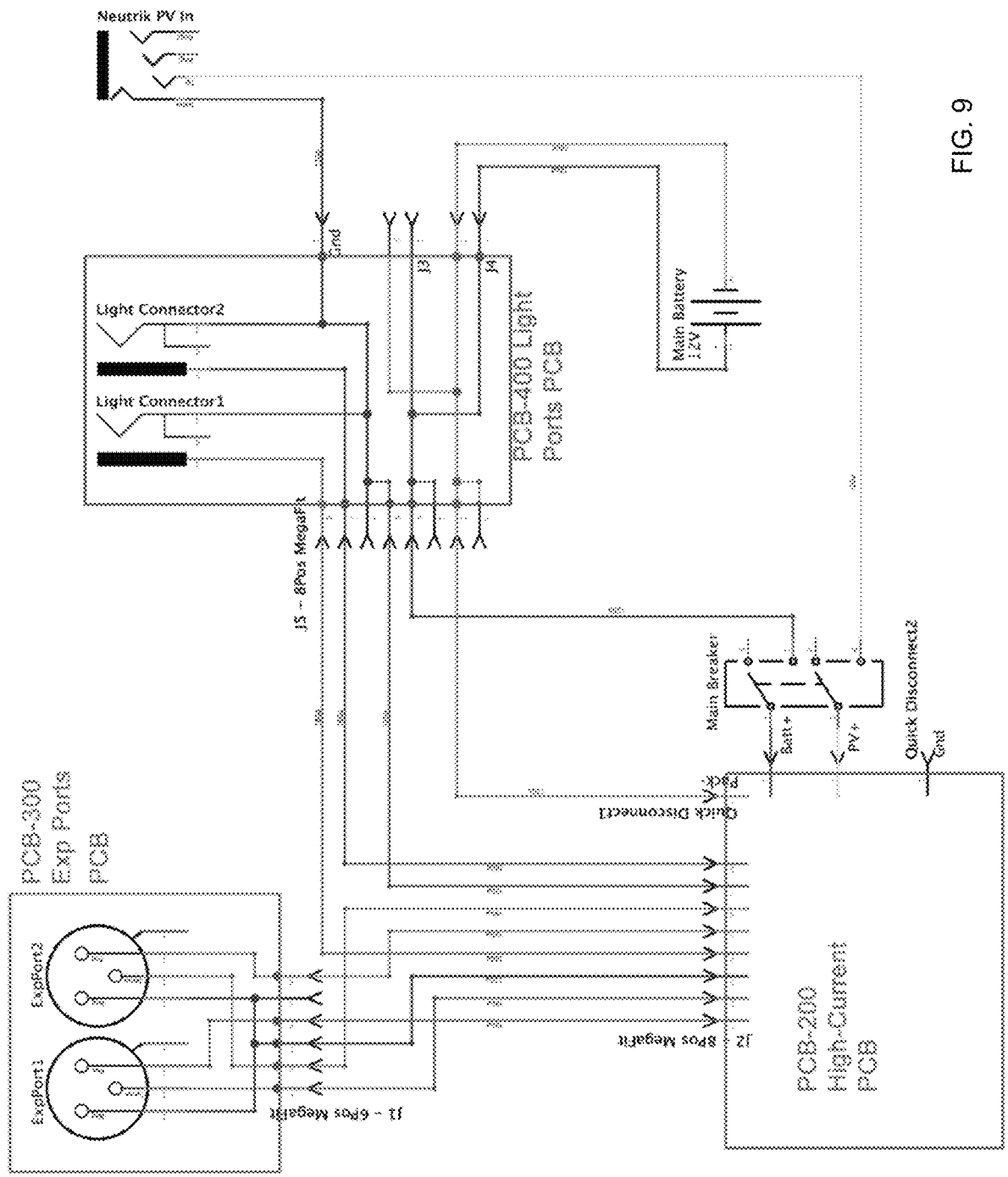
FIG. 9 is a schematic diagram illustrating how expansion ports may be integrated with a portable power management system.

The Solar Suitcase is capable of powering additional electronics referred to as Expansion Boxes, which might have a number of functions including, for example, controlling additional lights, providing a number of additional USB charging ports, powering a security light (e.g., which only comes on at night), or controlling larger loads (e.g., a refrigerator or laptop). Expansion Boxes can be connected to the Solar Suitcase through Expansion Ports on the outside of the suitcase (see, for example, FIG. 7). Different load types may require different control methods such as, for example, only turning on security lights at night, or only allowing auxiliary charging ports to power devices when the suitcase battery is already full. According to specific implementations, suitcase control of these Expansion Ports is specific to the load type which depends on what type of Expansion Box is connected. In addition to the power and ground pins, the expansion ports have a third sense pin which is used to sense which box type has been attached. As shown in FIG. 8, each box type includes a corresponding cable with a specific resistor value between either ground or power and the sense pin. The voltage that appears on the sense pin when an Expansion Box is connected to an Expansion Port indicates to the Solar Suitcase what type of Expansion Box is connected.

In addition to sensing what type of Expansion Box is connected, the Solar Suitcase may also be placed in data collection mode where the read voltage on the sense pin is measured and logged to an internal memory card. Through this method, voltage data can be recorded from sources external to the suitcase, allowing for up to two sensors or input devices to be attached to the suitcase simultaneously and the state of those sensors logged periodically. This allows the suitcase to measure and log one or more states associated with its surroundings. These might include, for example, room light levels, temperature, barometric pressure, availability or quality of AC power, or any other parameter that can be converted to a calibrated voltage.

According to a specific implementation and in addition to such external log data, the Solar Suitcase is configured to record a variety of suitcase data including, for example, key internal electrical values, user interactions, and periodic status readings. These data are recorded onto an internal removable memory card. The card may be sized such that it can record data for the life of the product, and thus will also have ability to act as a "black box" to help understand causes if anything goes wrong in the suitcase.

The Solar Suitcase may also be configured to transmit or offload data; either automatically or in response to interrogation. According to a particular implementation, a cellular modem installed within the suitcase (e.g., a SIMCOM 900 cellular modem with custom firmware) is provided for this purpose. The modem may be set to offload data over normal cellular networks at a pre-set interval, and will offload data so that the health of systems installed in remote locations can be monitored. These data can include the logged data from external sensors, allowing for the monitoring of the physical state of a suitcase's surroundings from anywhere in the world. This will help in determining and tracking things like AC grid reliability for a specific location, temperature, or room light levels without having to install separate data loggers or travel to the locations to collect that data manually. This can be of tremendous value for understanding the clinic environment and continuing to improve the suitcase design. This capability could also be valuable for collecting data not yet considered, as the standalone power from the Solar Suitcase combined with its remote data offload capabilities means one could receive data anywhere there is sun and a cellular signal.

The following are various features and classes of features that may appear in various combinations in suitcases enabled by the present disclosure.

Data transmission/remote monitoring—(Suitcase can remotely send us collected data): In addition to local data logging onto a SD card for later reading, the same data can also be offloaded remotely using a 2G (or later) cellular modem-on-a-chip included on the suitcase circuit board. This feature also allows the system to present remotely-queued messages to the user on the suitcase LCD screen, and allows the suitcase firmware to be updated remotely.

Individual Load Channel Control—(each load socket is controlled specific to that socket's status, and the suitcase's state): Various parameters for each of the following load channels can be adjusted: (1) 12V Ports (Lighter Ports); (2) USB; (3) Lights (×2); (4) Expansion Ports (×2); and (5) Extra 12 v Port. For each of these channels, the following threshold parameters can be set independently to provide the most desirable and reliable operation of the suitcase: (1) overcurrent value (Amps) above which channel is turned off; (2) undervoltage value (Volts) below which channel is turned off; (3) overvoltage value (Volts) above which channel is turned off; (4) Battery State of Charge at which channel is turned on; (5) Battery State of Charge at which channel is turned off. In addition, the USB charging ports also have the ability to control their charge rate depending upon the suitcase battery state of charge. When the battery is discharged below a set threshold, the current available to these ports is be reduced to 0.5 A. Likewise, when the battery is charged above a set threshold, the charging current is increased (assuming the device allows it) up to the maximum allowed limit of 2.1 A.

Expansion Ports and Expansion (Satellite) Boxes—(the suitcase controls all attached accessory boxes differently depending upon box type): As discussed above, the suitcase may be designed so that various Expansion Boxes can be connected to the suitcase's Expansion Ports to provide additional power delivery method beyond those sockets contained within the suitcase itself. These Expansion Ports are load-aware, and able to sense which Expansion Box type is connected. This alters the Port's behavior appropriately for overcurrent levels and power on/off criteria depending upon which Expansion Box type is connected. Here are a few examples of specific box types and their behaviors: (1) Lights Box (default): This is a box at the end of a 10 m+ cord which is capable of controlling 2 additional LED lights (in addition to those connected directly to the suitcase). The box is capable of turning the attached lights on/off, and dimming them. When this box is attached to the suitcase, the overcurrent level is set at 6 A, and the connected Expansion Port is always on. (2) Nightlight Box: This is a box which would presumably power attached nightlights for security or automatic light control. When this box is attached, the Expansion Port will only provide power when the Solar Panels voltage fall below a set threshold, indicating nighttime. The overcurrent for this mode is set at 6 A. (3) Large Load Box: This box would power a larger load, like a refrigerator or another medical device. The Expansion Port would be set to only provide power in this mode when the main system battery State of Charge is above a set threshold. Overcurrent for this mode is 20 A.

Expansion Ports Sensing Feature—(suitcase can collect data on its surroundings): In addition to providing additional load-aware power outputs for the suitcase, the Expansion ports have the ability to read an external voltage. This could be useful for monitoring an external condition in the medical clinics, such as available AC voltage or an attached sensor of some type. For instance, the sensor could monitor physical conditions, electrical conditions, or medical-related occurrences in the clinic. These data are logged to the SD card, and could provide useful research data for various external conditions where the suitcase is installed.

LCD—(unique user interface): The LCD was added to the suitcase to ease the user's understanding of the Solar Suitcase's status. It shows the suitcase state of charge via an intuitive battery icon (such as is found in many other rechargeable electronics). It also shows the relative rate of currents into (PV) and out of (Loads) the battery, using an "electron pipe width" visual concept, so that the user can determine the relative amounts of energy flowing into vs. out of the battery. This allows the user to determine if too much energy is being used at any time relative to the amount of energy being generated—in a non-technical, icon-based manner. In addition, a small arrow shows whether the battery level is increasing (charging), or decreasing (discharging). In the case of faults in system operation, the LCD can show the channel affected, and the dot matrix area (normally not used) will list the problem details. Icons on the screen will indicate which subsystem is affected. By pushing a combination of buttons on the suitcase, the LCD will enter into a special mode not available to a typical end-user, where quantitative values are shown. This is to allow detailed suitcase status to be shown for troubleshooting or confirmation that the suitcase is working as designed. In this mode, various suitcase values such as voltages, currents, firmware levels, and more can be shown to more precisely identify the suitcase's status.

Data logging: The suitcase may include a slot for an SD memory card, which can be used for logging system performance. Examples of data that can be logged to the SD card include: (1) Approximate system temperature; (2) Battery voltage; (3) Load (current) on various ports; (4) PV voltage; (5) PV current; (6) Daily solar energy harvested; (7) Daily maximum and minimums for various voltages and currents; (8) System errors and times they occurred; (9) User activity such as dimming or turning on/off lamps. The data logging rate can be adjusted, and the data stored in a proprietary binary format that can be converted to text using a software viewer once offloaded from the suitcase.

Lamp buttons on front of suitcase interface: There are two buttons that can be used to turn on/off the 12V lamp ports as well as choose between two brightness levels. These brightness levels can be set via firmware, so that adjustments to lamp brightness can be made in manufacturing.

Nightlight feature: The suitcase includes a nightlight feature that indicates the physical position of the suitcase. This is helpful for health clinic staff to locate the suitcase at night when the room it is installed in may be completely dark. The nightlight feature is set to turn on when voltage is not detected on the PV terminals and the battery is of sufficiently high voltage.

MPPT solar charge controller circuit: A maximum powerpoint tracking (MPPT) Solar Charge controller integrated circuit (such as the LTC 8490) has been added to the Solar Suitcase printed circuit board that will offer MPPT for the solar PV circuit. This will increase energy harvest from the solar panel, reduce the total cost of parts, free up space in the suitcase, allow the use of higher voltage PV panels, and reduce suitcase assembly labor costs. The charge controller circuit will retain the suitcase's ability to use main lead-acid batteries as well as Lithium Ion.

For implementations with data transmission and/or remote monitoring enabled, a variety of system parameters may be monitored and tracked. At least some of these examples are assumed to be on a 24-hour cycle, with offload frequency depending on the particular context or application: (1) PV—Hours of sunlight (PV>X Volts); (2) PV—Solar Energy Harvested, in Watt-hours; (3) Battery—State of Health (as defined by battery monitor chip+/−our assessment algorithm); (4) Battery—Minutes at Low Voltage Disconnect (battery fully discharged); (5) Battery—Minutes at 100% charged (and/or luxury port was on); (6) Battery—Min State Of Charge; (7) Battery—Max system Volts; (8) Battery—Min system Volts; (9) Loads—Hours of lights used (either aggregate, or by individual light circuit); (10) Loads—Total Energy used, in Watt-hours; (11) Loads—Max Current; (12) Other—GPS Location; (13) Current System Faults (as of moment of offload); (14) PV—Max Current; (15) PV—Avg Current; (16) Loads—Avg Current; (17) Other—Auxiliary ADC channel(s) to measure Max/Avg/Hours of attached external sensor; Most likely use is: Hours of grid availability at health center (binary status of available voltage on AC plug at clinic); (18) Other—Max Temperature; (19) Other—Avg Temperature; (20) PV—Sunrise Time; (21) PV—Sunset Time.

For a charge controller that has no method to communicate data, at least some of these values will be generated with corresponding measurement circuits. Some suitcase designs may include circuits necessary to make the following measurements (e.g., a I2C/SPI buss with ICs throughout the PCB). An optional daughter-board or corner of the main PCB could be optionally loaded with data storage and offload electronics. (1) Current/voltage measurement on PV incoming to charge controller; (2) Battery Measurements (all values already present on battery monitoring IC, which is SPI/I2C capable); (3) Current measurement on each output load circuit; (4) GPS unit (perhaps already on GSM unit); (5) Temperature measurement (perhaps already on GSM); (6) External ADC channel(s) for auxiliary input.

According to some implementations, the Expansion Ports have a UI-selectable software setting as to whether each port is used for input (voltage sensing), or for output (power cables). A high-impedance 3.3V (relative to gnd) is injected onto the sense line of each Expansion Port. This voltage is there so that we can use resistors between the Sense and Gnd pins in a cable connector to indicate which type of expansion box is connected.

If the port is used for input, any external voltage we wish to sense will have to be low-impedance enough to overcome the 3.3V being injected on that sense line. The signal conditioning circuitry will protect the ADC up to a sustained 30V (chosen because no PV voltages go higher than that). Any voltage fed into the sense line that is above 3.3V and below 30V will be read as 3.3V by the ADC. No voltage above 30V should ever be intentionally fed into the EXP Port sense lines. Additional protection of the ADC may be provided for voltages above 30V.

If the port is selected to be used as an output, the sense line will determine which type of cable is connected. Each cable type will have a different resistor between its Sense and Ground pins, to pull the injected 3.3 v to a specified voltage. According to a specific implementation, we can identify the following 5 types of attached loads/cables based upon voltage sensed: (1) 3.3V: (no cable resistor) Lights Expansion Box; Stays on always; Considered over-current at >6 A; (2) 2.475V: Night Light Box; On whenever PV voltage is <5V; Considered over-current at >6 A; (3) 1.65V: Luxury Box; On when the "Extra12V" lighter socket in the suitcase is on; Considered over-current at >20 A; (4) 0.825V: Reserved for future definition; (5) 0.0V: Big Loads Box; On until battery gets low, same as 12V lighter sockets in suitcase; Considered over-current at >20 A.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A portable power management system, comprising:
   an energy storage device;
   a solar array connection port;
   one or more power delivery ports, each power delivery port being configured for connection to a corresponding known load type;
   one or more expansion ports, each expansion port being configured to connect to a plurality of external load types, each expansion port having associated load sensing circuitry configured to detect each of the plurality of external load types, the load sensing circuitry of each expansion port being configured to sense an external voltage associated with a connected external load;
   control circuitry configured to control charging of the energy storage device using power received from one or more solar panels via the solar array connection port, the control circuitry also being configured to control delivery of power from the energy storage device to each power delivery port using one or more known load control methods corresponding to the one or more known load types, the control circuitry also being configured to control delivery of power from the energy storage device to each expansion port using one of a plurality of external load control methods depending on the external load type detected by the load sensing circuitry of each expansion port;
   memory configured to store performance data generated by the control circuitry relating to charging of the energy storage device and delivery of power via the one or more power delivery ports and the one or more expansion ports, the performance data including the external voltage associated with the connected external load; and
   wireless communication circuitry configured to transmit at least some of the performance data to a remote system, and to receive update information for reconfiguring the control circuitry.

2. The system of claim 1, wherein each of the external load control methods includes an overcurrent level and power on/off criterion for the corresponding external load type.

3. The system of claim 2, wherein the power on/off criterion corresponds to one of (1) always on, (2) on only when a voltage of the one or more solar panels is below a voltage threshold, or (3) on only when a charge level of the energy storage device is above a charge threshold.

4. The system of claim 1, wherein the load sensing circuitry of each expansion port is user-configurable to sense the external voltage.

5. The system of claim 1, wherein the performance data include one or more of (1) system temperature, (2) one or more voltages of the energy storage device, (3) load current for each of the one or more power delivery ports and each of the one or more expansion ports, (4) one or more voltages of the one or more solar panels, (5) one or more currents of the one or more solar panels, (6) daily power generated by the one or more solar panels, (7) daily maximum and minimum voltages and/or currents for a plurality of system nodes, (8) system errors, or (9) user activity.

6. The system of claim 1, wherein the control circuitry is further configured to adjust a rate at which the performance data are generated.

7. The system of claim 1, further comprising a user interface configured to generate a representation of power flowing into and out of the energy storage device, and to generate a representation of which of the one or more power delivery ports and the one or more expansion ports are using power.

8. The system of claim 7, wherein the user interface is also configured to generate a representation of messages received via the wireless communication circuitry.

9. The system of claim 1, wherein the control circuitry is configured to control charging of the energy storage device using a maximum power-point tracking (MPPT) solar charge controller.

10. The system of claim 1, wherein the load sensing circuitry of each expansion port is also configured to sense an external voltage associated with a connected external load, and wherein the external voltage is included in the performance data.

11. The system of claim 10, wherein the load sensing circuitry of each expansion port is user-configurable to sense the external voltage.

12. A portable power management system, comprising:
    an energy storage device;
    a solar array connection port;

one or more power delivery ports, each power delivery port being configured for connection to a corresponding known load type;

one or more expansion ports, each expansion port being configured to connect to a plurality of external load types, each expansion port having associated load sensing circuitry configured to detect each of the plurality of external load types;

control circuitry configured to control charging of the energy storage device using power received from one or more solar panels via the solar array connection port, the control circuitry also being configured to control delivery of power from the energy storage device to each power delivery port using one or more known load control methods corresponding to the one or more known load types, the control circuitry also being configured to control delivery of power from the energy storage device to each expansion port using one of a plurality of external load control methods depending on the external load type detected by the load sensing circuitry of each expansion port;

memory configured to store performance data generated by the control circuitry relating to charging of the energy storage device and delivery of power via the one or more power delivery ports and the one or more expansion ports;

wireless communication circuitry configured to transmit at least some of the performance data to a remote system, and to receive update information for reconfiguring the control circuitry; and a user interface configured to generate a representation of power flowing into and out of the energy storage device, and to generate a representation of which of the one or more power delivery ports and the one or more expansion ports are using power.

13. The system of claim 12, wherein each of the external load control methods includes an overcurrent level and power on/off criterion for the corresponding external load type.

14. The system of claim 13, wherein the power on/off criterion corresponds to one of (1) always on, (2) on only when a voltage of the one or more solar panels is below a voltage threshold, or (3) on only when a charge level of the energy storage device is above a charge threshold.

15. The system of claim 12, wherein the performance data include one or more of (1) system temperature, (2) one or more voltages of the energy storage device, (3) load current for each of the one or more power delivery ports and each of the one or more expansion ports, (4) one or more voltages of the one or more solar panels, (5) one or more currents of the one or more solar panels, (6) daily power generated by the one or more solar panels, (7) daily maximum and minimum voltages and/or currents for a plurality of system nodes, (8) system errors, or (9) user activity.

16. The system of claim 12, wherein the control circuitry is further configured to adjust a rate at which the performance data are generated.

17. The system of claim 12, wherein the user interface is also configured to generate a representation of messages received via the wireless communication circuitry.

18. The system of claim 12, wherein the control circuitry is configured to control charging of the energy storage device using a maximum power-point tracking (MPPT) solar charge controller.

19. A portable power management system, comprising:

an energy storage device;

a solar array connection port;

one or more power delivery ports, each power delivery port being configured for connection to a corresponding known load type;

one or more expansion ports, each expansion port being configured to connect to a plurality of external load types, each expansion port having associated load sensing circuitry configured to detect each of the plurality of external load types, the load sensing circuitry of each expansion port being configured to sense an external voltage associated with a connected external load;

control circuitry configured to control charging of the energy storage device using power received from one or more solar panels via the solar array connection port, the control circuitry also being configured to control delivery of power from the energy storage device to each power delivery port using one or more known load control methods corresponding to the one or more known load types, the control circuitry also being configured to control delivery of power from the energy storage device to each expansion port using one of a plurality of external load control methods based on the external voltage sensed by the load sensing circuitry of each expansion port;

memory configured to store performance data generated by the control circuitry relating to charging of the energy storage device and delivery of power via the one or more power delivery ports and the one or more expansion ports;

wireless communication circuitry configured to transmit at least some of the performance data to a remote system, and to receive update information for reconfiguring the control circuitry; and a user interface configured to generate a representation of power flowing into and out of the energy storage device, and to generate a representation of which of the one or more power delivery ports and the one or more expansion ports are using power.

* * * * *